US009779883B2

(12) United States Patent
Zhamu et al.

(10) Patent No.: US 9,779,883 B2
(45) Date of Patent: *Oct. 3, 2017

(54) PARTIALLY SURFACE-MEDIATED LITHIUM ION-EXCHANGING CELLS AND METHOD FOR OPERATING SAME

(75) Inventors: Aruna Zhamu, Centerville, OH (US); ChenGuang Liu, Fairbone, OH (US); Bor Z. Jang, Centerville, OH (US)

(73) Assignee: Nanotek Instruments, Inc., Dayton, OH (US)

( * ) Notice: Subject to any disclaimer, the term of this patent is extended or adjusted under 35 U.S.C. 154(b) by 955 days.

This patent is subject to a terminal disclaimer.

(21) Appl. No.: 13/199,713

(22) Filed: Sep. 7, 2011

(65) Prior Publication Data

US 2013/0059174 A1    Mar. 7, 2013

(51) Int. Cl.

| | |
|---|---|
| *H01M 4/133* | (2010.01) |
| *H01M 10/052* | (2010.01) |
| *H01G 11/06* | (2013.01) |
| *H01M 4/583* | (2010.01) |
| *H01G 11/36* | (2013.01) |
| *H01G 11/56* | (2013.01) |
| *H01M 4/62* | (2006.01) |

(52) U.S. Cl.
CPC ............ *H01G 11/06* (2013.01); *H01G 11/36* (2013.01); *H01G 11/56* (2013.01); *H01M 4/133* (2013.01); *H01M 4/583* (2013.01); *H01M 4/625* (2013.01); *H01M 10/052* (2013.01); *Y02E 60/13* (2013.01)

(58) Field of Classification Search
CPC ............... H01M 4/133; H01M 10/05–10/0525
See application file for complete search history.

(56) References Cited

U.S. PATENT DOCUMENTS

| | | | | |
|---|---|---|---|---|
| 6,094,338 A | * | 7/2000 | Hirahara | ............. H01G 9/155 29/25.03 |
| 7,071,258 B1 | | 7/2006 | Jang et al. | |
| 7,623,340 B1 | | 11/2009 | Song et al. | |
| 7,745,047 B2 | | 6/2010 | Zhamu et al. | |
| 8,889,298 B2 | * | 11/2014 | Zhamu et al. | ............. 429/231.8 |

(Continued)

OTHER PUBLICATIONS

U.S. Appl. No. 11/800,728, filed May 8, 2007, A. Zhamu, et al.

(Continued)

*Primary Examiner* — Jonathan Crepeau
*Assistant Examiner* — Jacob Buchanan

(57) ABSTRACT

A lithium super-battery cell comprising: (a) A cathode comprising a cathode active material having a surface area to capture or store lithium thereon, wherein the cathode active material is not a functionalized material and does not bear a functional group; (b) An anode comprising an anode current collector; (c) A porous separator disposed between the two electrodes; (d) A lithium-containing electrolyte in physical contact with the two electrodes, wherein the cathode active material has a specific surface area of no less than 100 $m^2/g$ being in direct physical contact with the electrolyte to receive lithium ions therefrom or to provide lithium ions thereto; and (e) A lithium source implemented at one or both of the two electrodes prior to a first charge or a first discharge cycle of the cell. This new generation of energy storage device exhibits the best properties of both the lithium ion battery and the supercapacitor.

23 Claims, 12 Drawing Sheets

(56) References Cited

U.S. PATENT DOCUMENTS

| | | | |
|---|---|---|---|
| 8,895,189 B2* | 11/2014 | Zhamu et al. | 429/231.8 |
| 2002/0172865 A1* | 11/2002 | Che | H01G 11/06 |
| | | | 429/231.1 |
| 2004/0131940 A1* | 7/2004 | Suzuki | H01M 4/133 |
| | | | 429/231.95 |
| 2007/0077495 A1* | 4/2007 | Yazami | H01M 4/133 |
| | | | 429/322 |
| 2008/0279756 A1* | 11/2008 | Zhamu et al. | 423/448 |
| 2009/0098463 A1* | 4/2009 | Liu et al. | 429/231.95 |
| 2009/0246625 A1* | 10/2009 | Lu | H01M 4/133 |
| | | | 429/207 |
| 2010/0028681 A1* | 2/2010 | Dai et al. | 428/408 |
| 2010/0035093 A1* | 2/2010 | Ruoff et al. | 429/12 |
| 2010/0176337 A1* | 7/2010 | Zhamu et al. | 252/182.1 |
| 2010/0178531 A1* | 7/2010 | Amaratunga et al. | 429/7 |
| 2010/0310908 A1* | 12/2010 | Zhang | H01M 4/364 |
| | | | 429/90 |
| 2011/0052998 A1* | 3/2011 | Liang | C01B 31/12 |
| | | | 429/300 |

OTHER PUBLICATIONS

U.S. Appl. No. 12/806,679, filed Aug. 9, 2010, C. G. Liu, et al.
U.S. Appl. No. 12/924,211, filed Sep. 23, 2010, C. G. Liu, et al.
U.S. Appl. No. 12/928,927, filed Dec. 23, 2010, A. Zhamu, et al.
U.S. Appl. No. 12/930,294, filed Jan. 3, 2011, A. Zhamu, et al.
S. W. Lee, et al, "High Power Lithium Batteries from Functionalized Carbon Nanotubes," Nature Nanotechnology, 5 (2010) 531-537.

* cited by examiner (A) Conventional Li-ion battery (LIB)

(A)

(B)

(A)

(B)

PARTIALLY SURFACE-MEDIATED LITHIUM ION-EXCHANGING CELLS AND METHOD FOR OPERATING SAME

This invention is based on the research results of a project sponsored by the US National Institute of Standard and Technology (NIST) Technology Innovation Program (TIP).

FIELD OF THE INVENTION

The present invention relates generally to the field of electrochemical energy storage devices and, more particularly, to a new lithium ion-exchanging energy storage device wherein the cathode does not involve lithium diffusion in and out of the bulk of a solid electrode-active material (i.e., requiring no lithium intercalation or de-intercalation). The lithium storage mechanism in the cathode is surface-controlled, obviating the need for solid-state diffusion (intercalation or de-intercalation) of lithium, which otherwise is very slow. This device has the high energy density of a lithium-ion battery and the high power density of a supercapacitor (usually even higher than the power densities of supercapacitors). This device is herein referred to as a partially surface-mediated lithium ion-exchanging cell or a lithium super-battery.

BACKGROUND OF THE INVENTION

Supercapacitors (Ultra-Capacitors or Electro-Chemical Capacitors):

Supercapacitors are being considered for electric vehicle (EV), renewable energy storage, and modem grid applications. The high volumetric capacitance density of a supercapacitor derives from using porous electrodes to create a large surface area conducive to the formation of diffuse double layer charges. This electric double layer (EDL) is formed in the electrolyte near the electrode surface when voltage is imposed (FIGS. 1(B) and 2(A)). The required ions for this EDL mechanism near an electrode are pre-existing in the liquid electrolyte when the cell is made or in a discharged state (FIG. 2(B)), and do not come from the opposite electrode surface or interior. In other words, the required ions to be formed into an EDL near the surface of a negative electrode (anode) active material (e.g., activated carbon particle) do not come from the bulk or surface per se of the positive electrode (cathode). The required ions (for the anode EDL formation during the cell charging step) are not captured or stored earlier in the surface or interior of a cathode active material (instead, they are present inside the electrolyte phase at either the anode side or the cathode side). Similarly, the required ions to be formed into an EDL near the surface (but not on the surface) of a cathode active material do not come from the very surface or interior of an anode active material. Furthermore, the number of cations and the number of anions that participate in the charge storage function are essentially equal in a supercapacitor.

When the supercapacitor is re-charged, the ions (both cations and anions) that are already in the liquid electrolyte are electrochemically driven to form EDLs near their respective electrodes. There is no major exchange of ions between an anode active material and a cathode active material. The amount (capacitance) of charges that can be stored is dictated solely by the concentrations of cations and anions that are already available in the electrolyte. These concentrations are typically very low (limited by the solubility of a salt in a solvent), resulting in a low energy density. Further, lithium ions are usually not part of preferred or commonly used supercapacitor electrolytes. When the supercapacitor is discharged, both the cations and the anions are simply re-distributed in the electrolyte in a random manner (FIG. 2(B)).

In some supercapacitors, the stored energy is further augmented by pseudo-capacitance effects due to some electrochemical reactions (e.g., redox). In such a pseudo-capacitor, the ions involved in a redox pair also pre-exist in the electrolyte. Again, there is no major exchange of ions between an anode active material and a cathode active material.

Since the formation of EDLs does not involve a chemical reaction or an exchange of ions between the two opposite electrodes, the charge or discharge process of an EDL supercapacitor can be very fast, typically in seconds, resulting in a very high power density (typically 3,000-8,000 W/Kg). Compared with batteries, supercapacitors offer a higher power density, require no maintenance, offer a much higher cycle-life, require a very simple charging circuit, and are generally much safer. Physical, rather than chemical, energy storage is the key reason for their safe operation and extraordinarily high cycle-life.

Despite the positive attributes of supercapacitors, there are several technological barriers to widespread implementation of supercapacitors for various industrial applications. For instance, supercapacitors possess very low energy densities when compared to batteries (e.g., 5-8 Wh/kg for commercial supercapacitors vs. 10-30 Wh/Kg for the lead acid battery and 50-100 Wh/kg for the NiMH battery). Lithium-ion batteries possess a much higher energy density, typically in the range of 100-180 Wh/kg, based on the cell weight.

Lithium-Ion Batteries:

Although possessing a much higher energy density, lithium-ion batteries deliver a very low power density (typically 100-500 W/Kg), requiring typically hours for re-charge. Conventional lithium-ion batteries also pose some safety concern.

The low power density or long re-charge time of a lithium ion battery is due to the mechanism of shuttling lithium ions between the interior of an anode and the interior of a cathode, which requires lithium ions to enter or intercalate into the bulk of anode active material particles during re-charge, and into the bulk of cathode active material particles during discharge. For instance, as illustrated in FIG. 1(A), in a most commonly used lithium-ion battery featuring graphite particles as an anode active material, lithium ions are required to diffuse into the inter-planar spaces of a graphite crystal at the anode during re-charge. Most of these lithium ions have to come all the way from the cathode side by diffusing out of the bulk of a cathode active particle, through the pores of a solid separator (pores being filled with a liquid electrolyte), and into the bulk of a graphite particle at the anode. The liquid electrolyte (where lithium ions can easily swim through) is excluded from the bulk of a particle and, hence, the migration of lithium ions from the particle surface to the interior (e.g. the center of a solid graphite particle) must occur via very slow solid-state diffusion (intercalation), as illustrated at the bottom portion of FIG. 1(A).

During discharge, lithium ions diffuse out of the anode active material (e.g. de-intercalate out of graphite particles), migrate through the liquid electrolyte phase, and then diffuse into the bulk of complex cathode crystals (e.g. intercalate into particles lithium cobalt oxide, lithium iron phosphate, or other lithium insertion compound). In other words, liquid electrolyte only reaches the external surface of a solid particle (e.g. graphite particle 10 μm in diameter) and lithium ions swimming in the liquid electrolyte can only migrate (via fast liquid-state diffusion) to the graphite surface. To penetrate into the bulk of a solid graphite particle would require a slow solid-state diffusion (commonly referred to as "intercalation") of lithium ions. The diffusion coefficients of lithium in solid particles of lithium metal oxide are typically $10^{-16}$-$10^{-8}$ cm$^2$/sec (more typically $10^{-14}$-$10^{-10}$ cm$^2$/sec), and those of lithium in liquid are approximately $10^{-6}$ cm$^2$/sec.

In other words, these intercalation or solid-state diffusion processes require a long time to accomplish because solid-state diffusion (or diffusion inside a solid) is difficult and slow. This is why, for instance, the current lithium-ion battery for plug-in hybrid vehicles requires 2-7 hours of recharge time, as opposed to just seconds for supercapacitors. The above discussion suggests that an energy storage device that is capable of storing as much energy as in a battery and yet can be fully recharged in one or two minutes like a supercapacitor would be considered a revolutionary advancement in energy storage technology.

More Recent Developments:

Recently, chemically functionalized, multi-walled carbon nano-tubes (CNTs) containing carbonyl groups were used by Lee, et al as a cathode material for a lithium-ion capacitor (LIC, as illustrated in FIG. 1(E)) containing lithium titanate as the anode material [S. W. Lee, et al, "High Power Lithium Batteries from Functionalized Carbon Nanotubes," *Nature Nanotechnology*, 5 (2010) 531-537]. In a super-battery configuration (FIG. 1(D)), lithium foil was used as the anode and functionalized CNTs as the cathode, providing a relatively high power density. However, the CNT-based electrodes prepared by the layer-by-layer (LBL) approach suffer from several technical issues beyond just the high costs. Some of these issues are:

(1) CNTs contain a significant amount of impurity, particularly those transition metal or noble metal particles used as a catalyst required of a chemical vapor deposition process for CNT production. These catalytic materials are highly undesirable in a battery electrode due to their high propensity to cause harmful reactions with electrolyte.

(2) CNTs tend to form a tangled mass resembling a hairball, which is difficult to work with during electrode fabrication (e.g., difficult to disperse in a liquid solvent or resin matrix).

(3) The so-called "layer-by-layer" approach (LBL) used by Lee, et al is a slow and expensive process that is not amenable to large-scale fabrication of battery electrodes, or mass production of electrodes with an adequate thickness (most of the batteries have an electrode thickness of 100-300 μm). The thickness of the LBL electrodes produced by Lee, et al (a noted MIT research group) was limited to 3 μm or less.

(4) One might wonder how the thickness of the LBL CNT electrodes would impact the performance of the cells. A careful inspection of the data provided by Lee, et al (e.g. FIG. S-7 of the Supporting Material of Lee, et al) show that the power density dropped by one order of magnitude when the LBL CNT electrode thickness was increased from 0.3 μm to 3.0 μm. The performance is likely to drop even further if the electrode thickness is increased to that of a useful battery or supercapacitor electrode (e.g., 100-300 μm).

(5) Although the ultra-thin LBL CNT electrodes provide a high power density (since Li ions only have to travel an extremely short distance), there was no data to prove that CNT-based electrodes of practical thickness could even work due to the poor CNT dispersion and electrolyte inaccesability issues. Lee, et al showed that the CNT-based composite electrodes prepared without using the LBL approach did not exhibit good performance.

(6) CNTs have very limited amounts of suitable sites to accept a functional group without damaging the basal plane structure. A CNT has only one end that is readily functionalizable and this end is an extremely small proportion of the total CNT surface. By chemically functionalizing the exterior basal plane, one could dramatically compromise the electronic conductivity of a CNT.

Most recently, our research groups have reported, in two patent applications, the development of two new classes of highly conducting cathode active materials having a functional group that is capable of rapidly and reversibly forming a redox reaction with lithium ions. These materials are nano graphene (both single-layer graphene and multi-layer graphene sheets, collectively referred to as nano graphene platelets or NGPs) and disordered carbon (including soft carbon, hard carbon, carbon black, activated carbon, amorphous carbon, etc). These two patent applications are: C. G. Liu, et al., "Lithium Super-battery with a Functionalized Nano Graphene Cathode," U.S. patent application Ser. No. 12/806,679 (Aug. 19, 2010) and C. G. Liu, et al, "Lithium Super-battery with a Functionalized Disordered Carbon Cathode," U.S. patent application Ser. No. 12/924,211 (Sep. 23, 2010).

These new types of cathode active materials (used in the so-called "lithium super-battery") include a chemically functionalized nano graphene platelet (NGP) or a functionalized disordered carbon material having certain specific functional groups capable of reversibly and rapidly forming a redox pair with a lithium ion during the charge and discharge cycles of a battery cell. In these two patent applications, the functionalized disordered carbon or functionalized NGP is used in the cathode (not the anode) of the lithium super-battery. In this cathode, lithium ions in the liquid electrolyte only have to migrate to the edges or surfaces of graphene sheets (in the case of functionalized NGP cathode), or the edges/surfaces of the aromatic ring structures (small graphene sheets) in a disordered carbon matrix. No solid-state diffusion is required at the cathode. The presence of a functionalized graphene or carbon having functional groups thereon enables reversible storage of lithium on the surfaces (including edges), not the bulk, of the cathode material. Such a cathode material provides one type of lithium-storing or lithium-capturing surface.

In conventional lithium-ion batteries, lithium ions must diffuse into and out of the bulk of a cathode active material, such as lithium cobalt oxide (LiCoO$_2$) and lithium iron phosphate (LiFePO$_4$). In these conventional lithium-ion batteries, lithium ions must also diffuse in and out of the inter-planar spaces in a graphite crystal serving as an anode active material. The lithium insertion or extraction procedures at both the cathode and the anode are very slow. Due to these slow processes of lithium diffusion in and out of these intercalation compounds (commonly referred to as solid-state diffusion or intercalation processes), the conventional lithium ion batteries do not exhibit a high power density and the batteries require a long re-charge time. None of these conventional devices rely on select functional groups (e.g. attached at the edge or basal plane surfaces of a graphene sheet) that readily and reversibly form a redox reaction with a lithium ion from a lithium-containing electrolyte.

In contrast, the super-battery as reported in our two earlier patent applications (U.S. application Ser. No. 12/806,679 and Ser. No. 12/924,211), relies on the operation of a fast and reversible reaction between a functional group (attached or bonded to a graphene structure at the cathode) and a lithium ion in the electrolyte. Lithium ions coming from the anode side through a separator only have to diffuse in the liquid electrolyte to reach a surface/edge of a graphene plane in the cathode. These lithium ions do not need to diffuse into or out of the volume of a solid particle. Since no diffusion-limited intercalation is involved at the cathode, this process is fast and can occur in seconds. Hence, this is a totally new class of hybrid supercapacitor-battery that exhibits unparalleled and unprecedented combined performance of an exceptional power density, high energy density, long and stable cycle life, and wide operating temperature range. This device has the best of both battery and supercapacitor worlds.

In the lithium super-batteries described in these two earlier patent applications, the anode comprises either particles of a lithium titanate-type anode active material (Type-2 super-battery, still requiring some solid state diffusion in the first discharge or first charge operation, but no intercalation thereafter) or a lithium foil alone, along with an anode current collector (Type-1 super-battery). Hence, these lithium super-batteries are also referred to as partially surface-mediated, lithium ion-exchanging cells.

The instant application claims the benefits of the two co-pending U.S. application Ser. No. 12/806,679 (Aug. 19, 2010) and Ser. No. 12/924,211 (Sep. 23, 2010) Ser. No. 12/928,927, but discloses a more general and versatile approach that also involves the exchange of massive lithium ions between an anode and the surfaces of a cathode. These cathode surfaces in the instant application are not based on a functionalized material (defined as a material bearing a functional group capable of forming a redox pair with lithium). Instead, we have most surprisingly observed that, without any functional group, some graphene surfaces are fully capable of capturing or trapping more lithium atoms. Regardless if the surfaces contain functional groups or not, graphene surfaces are capable of storing lithium atoms in a stable and reversible manner, provided these surfaces are accessible to lithium ion-containing electrolyte and are in direct contact with the electrolyte. After extensive in-depth studies, we have further observed that the lithium storing capacity is in direct proportion to the total surface area that is directly exposed to the lithium ion-containing electrolyte. For instance, some of the specific capacity measurements were conducted on the cells containing a pristine graphene cathode composed of essentially all carbon atoms only (>99% C), having no functional group such as —OH or —COOH. Hence, the mechanism of Li-functional group redox reaction could not be the lithium storage mechanism. The two co-pending US patent applications claim the functionalized material-based super-batteries, but the instant application claims the super-batteries based on a non-functionalized material cathode.

SUMMARY OF THE INVENTION

For the purpose of defining the scope of the claims in the instant application, the lithium super-battery or partially surface-mediated cell does not include any lithium-air (lithium-oxygen) cell, lithium-sulfur cell, or any cell wherein the operation of the energy storage device involves the introduction of oxygen from outside of the device, or involves the formation of a metal oxide, metal sulfide, metal selenide, metal telluride, metal hydroxide, or metal-halogen compound at the cathode. These cells involve a strong cathode reaction during cell discharge and, hence, the recharge reaction is not very reversible (having very low round-trip efficiency) and exhibit extremely poor power density.

The present invention provides a super-battery cell, comprising: (a) A positive electrode (cathode) comprising a cathode active material having a surface area to capture or store lithium thereon (the cathode active material is not a functionalized material, having no functional group to capture a lithium atom); (b) A negative electrode (anode) comprising an anode current collector; (c) A porous separator disposed between the two electrodes; (d) A lithium-containing electrolyte in physical contact with the two electrodes, wherein the cathode active material has a specific surface area of no less than 100 $m^2$/g being in direct physical contact with the electrolyte to receive lithium ions therefrom or to provide lithium ions thereto; and (e) A lithium source implemented at the anode or cathode prior to a first discharge or a first charge cycle of the cell. The lithium source may be preferably in a form of solid lithium foil, lithium chip, lithium powder, or surface-stabilized lithium particles. Such a cell is herein referred to as a Type-1 super-battery and the operation normally does not involve any solid state diffusion. The lithium source may be a layer of lithium thin film pre-loaded on surfaces of an anode active material.

If the lithium source is a lithium intercalation compound or a lithiated compound (such as prelithiated graphite, prelithiated carbon, lithiated titanium dioxide, lithium titanate, lithium manganate, a lithium transition metal oxide, or $Li_4Ti_5O_{12}$), such a cell is referred to as a Type-2 super-battery. In a Type-2 super-battery, the first discharge or first charge operation can involve some de-intercalation or solid-state diffusion, but the subsequent charge/discharge cycles are essentially intercalation-free and de-intercalation-free (essentially involving no solid-state diffusion).

The surfaces of a super-battery electrode material (e.g., pristine graphene containing essentially >99% carbon), despite having no functional groups bonded thereon, are capable of capturing lithium ions directly from a liquid electrolyte phase and storing lithium atoms on the surfaces in a reversible and stable manner, even though this monolayer of lithium atoms remains immersed in electrolyte. Scientifically this has been quite unexpected since one would expect the liquid electrolyte to be more competitive than bare graphene surfaces for retaining or capturing lithium.

The electrolyte preferably comprises liquid electrolyte (e.g. organic liquid or ionic liquid) or gel electrolyte in which lithium ions have a high diffusion coefficient. Solid electrolyte is normally not desirable, but some thin layer of solid electrolyte may be used if it exhibits a relatively high diffusion rate.

To illustrate the operational principle of this new super-battery (FIG. 3(A), Type-1), one may consider a case wherein a lithium source (e.g. small pieces of lithium foil) is implemented between an anode current collector and a porous polymer separator when the battery device is made, and wherein a nano-structured cathode comprises non-functionalized graphene sheets surrounded by interconnected pores that are preferably meso-scaled (2 nm-50 nm), but can be smaller than 2 nm. Referring to FIG. 3(A)-(C), during the first discharge cycle, lithium foil is ionized to generate lithium ions in the liquid electrolyte. Lithium ions rapidly migrate through the pores of the polymer separator into the cathode side. Since the cathode is also menu-porous having interconnected pores to accommodate liquid electrolyte therein, lithium ions basically just have to swim through liquid to reach an active site (not a functional group) on a surface or edge of a graphene sheet at the cathode. The graphene surface is in direct contact with electrolyte and readily accepts lithium ions from the electrolyte. Because all the steps (lithium ionization, liquid phase diffusion, and surface trapping/adsoption/capturing) are fast and no solid-state diffusion is required, the whole process is very fast, enabling fast discharging of the cell and a high power density. This is in stark contrast to the conventional lithium-ion battery wherein lithium ions are required to diffuse into the bulk of a solid cathode particle (e.g., micron-sized lithium cobalt oxide) during discharge, which is a very slow process. During discharge of the lithium-ion battery, these lithium ions have to come out of the bulk of graphite particles at the anode. Since liquid electrolytes only reaches the surfaces of these micron-scaled graphite particles (not in direct contact with the graphene surfaces inside the graphite particle), the lithium de-intercalation step also require a slow solid-state diffusion.

In the above example, the discharge process continues until either the lithium foil is completely ionized or all the active sites on the cathode active materials are occupied by lithium atoms. During re-charge, lithium ions are released from the massive surfaces of the cathode active material (having no functional material attached thereon), diffuse through liquid electrolyte, and get captured by the surface of an anode current collector or a lithium source material. Again, no solid-state diffusion is required and, hence, the whole process is very fast, requiring a short re-charge time. This is as opposed to the required solid-state diffusion of lithium ions into the bulk of graphite particles at the anode of a conventional lithium-ion battery.

Clearly, the presently invented battery device provides a very unique platform of exchanging lithium ions between an anode and the massive surfaces of a cathode that requires no solid-state diffusion in both electrodes. The process is substantially dictated by the step of surface-capturing of lithium, plus the liquid-phase diffusion (all being very fast). Hence, the device is also herein referred to as a partially surface-mediated, lithium ion-exchanging battery. This is a totally different and patently distinct class of energy storage device than the conventional lithium-ion battery, wherein solid-state diffusion of lithium (intercalation and de-intercalation) is required at both the anode and the cathode during both the charge and discharge cycles.

In some super-battery cells, the lithium source can be a lithiated compound (e.g. implemented at the anode or the cathode) or lithium alloy. The lithium compound or lithium alloy is preferably a nano-scaled material having at least one dimension (e.g. thickness or diameter) less than 100 nm (preferably less than 20 nm and most preferably less than 10 nm).

This new partially surface-mediated, lithium ion-exchanging battery device is also patently distinct from the conventional supercapacitor based on the electric double layer (EDL) mechanism or pseudo-capacitance mechanism. In both mechanisms, no lithium ions are exchanged between the two electrodes (since lithium is not stored in the bulk or surfaces of the electrode; instead, they are stored in the electric double layers near the electrode surfaces, but in the electrolyte). When a supercapacitor is re-charged, the electric double layers are formed near the activated carbon surfaces at both the anode and the cathode sides. When the supercapacitor is discharged, both the negatively charged species and the positively charged species get randomized in the electrolyte (staying further away from electrode material surfaces). In contrast, when a super-battery is re-charged, essentially all of the lithium ions are electro-plated onto the surfaces of the anode current collector and the cathode side is essentially lithium-free. When the super-battery is discharged, essentially all the lithium ions are captured by the cathode active material surfaces (stored in the defects or bonded to the benzene ring centers). Very few lithium ions stay in the electrolyte.

More significantly, all the prior art supercapacitors do not contain an extra lithium source and their operations do not involve ionization of lithium from this lithium source. The charge storage capacitance of a supercapacitor (even when using a Li-containing electrolyte) is limited by the amounts of cations and anions that participate in the formation of EDL charges. These amounts are dictated by the original concentration of $Li^+$ ions and their counter ions (anions) from a lithium salt, which are in turn dictated by the solubility limits of these ions in the electrolyte solvent. To illustrate this point, let us assume that only up to 1 mole of $Li^+$ ions can be dissolved in 1 mL of a solvent and there are totally 5 mL of solvent added to a particular supercapacitor cell, Then, there is a maximum of 5 moles of $Li^+$ ions that can be present in the total cell and this amount dictates the maximum amount of charges that can be stored in this supercapacitor.

In contrast (and quite surprisingly), the amounts of lithium ions that can be shuttled between the anode surface and the cathode surface of a super-battery are not limited by the chemical solubility of lithium salt in this same solvent. Assume that an identical 5 mL of solvent (containing 5 moles of $Li^+$ ions, as described above for a supercapacitor) is used in the super-battery. Since the solvent is already fully saturated with the lithium salt, one would expect that this solvent cannot and will not accept any more $Li^+$ ions from an extra lithium source (5 moles being the maximum). Consequently, one would expect that these 5 moles of $Li^+$ ions are the maximum amount of lithium that we can use to store charges (i.e., the maximum amount of $Li^+$ ions that can be captured by the cathode during discharge, or the maximum amount of $Li^+$ ions that can be captured by the anode during re-charge). Contrary to this expectation by a person of ordinary or even extra-ordinary skill in the art of electrochemistry, we have surprisingly discovered that the amount of $Li^+$ ions that can be captured by the surfaces of either electrode (or, the amount of $Li^+$ ions that can be shuttled between the two electrodes) in a super-battery typically far exceeds this solubility limit by 1 or 2 orders of magnitude. The implementation of a lithium source at the anode appears to have defied this expectation by providing dramatically more lithium ions than what the solvent can dissolve therein.

Further surprisingly, in a super-battery, the amount of lithium capable of contributing to the charge storage is controlled (limited) by the amount of surface active sites of a cathode capable of capturing lithium ions from the electrolyte. This is so even when this amount of surface active sites far exceeds the amount of $Li^1$ ions that the solvent can hold at one time (e.g. 5 moles in the present discussion), provided that the implemented lithium source can provide the extra amount lithium ions. These active sites can be just the surface defects of graphene, or the benzene ring centers on a graphene plane (FIGS. 4(D) and (E)). Also quite unexpectedly, lithium atoms are found to be capable of strongly and reversibly bonding to the individual centers of benzene rings (hexagons of carbon atoms) that constitute a graphene sheet, or of being reversibly trapped by graphene surface defect sites.

In this super-battery, the cathode active material is not a functionalized material (i.e., having no functional group attached to its surface that is exposed to electrolyte). The functionalized material means a material having a functional group (e.g., carbonyl) that is capable of reacting with a lithium atom or ion to form a redox pair. However, it is essential that the cathode active material has a high specific surface area (>100 m$^2$/g) that is in direct contact with the electrolyte (e.g. being directly immersed in electrolyte) and capable of capturing lithium ions from the electrolyte and storing the lithium atoms in the surface active sites (e.g. surface defects and benzene ring centers). Preferably, the cathode active material has a specific surface area no less than 500 m$^2$/gram (preferably >1,000 m$^2$/gram, more preferably >1,500 m$^2$/gram, and most preferably >2,000 m$^2$/gram) to store or support lithium ions or atoms thereon.

Preferably, the lithium source comprises a lithium chip, lithium foil, lithium powder, surface-passivated or stabilized lithium particles, or a combination thereof. The lithium source may be implemented at the anode side before the first discharge procedure is carried out on this battery device. Alternatively, the lithium source may be implemented at the cathode side before the first charge procedure is carried out on this battery device. As another alternative, both the cathode and the anode may be fabricated to contain some lithium source during the battery manufacturing process. It is important to note that this solid lithium source provides the majority of the lithium ions that are to be exchanged between the anode surfaces and the cathode surfaces during the charge-discharge cycles. Although the lithium-containing electrolyte naturally provides some of the needed lithium ions, this amount is way too short to enable the battery device to deliver a high energy density. This is why any symmetric supercapacitor, even if containing Li-based electrolyte, does not exhibit a high energy density.

Preferably, the non-functionalized cathode active material is selected from the following: (a) A porous disordered carbon material selected from a soft carbon, hard carbon, polymeric carbon or carbonized resin, meso-phase carbon, coke, carbonized pitch, carbon black, activated carbon, or partially graphitized carbon; (b) A graphene material selected from a single-layer sheet or multi-layer platelet of graphene, graphene oxide, graphene fluoride, hydrogenated graphene, nitrogenated graphene, boron-doped graphene, nitrogen-doped graphene, or chemically or thermally reduced graphene oxide; (c) Exfoliated graphite; (d) Mesoporous carbon (e.g. obtained by template-assisted synthesis or chemical activation of meso phase carbon); (c) A carbon nanotube selected from a single-walled carbon nanotube or multi-walled carbon nanotube; (t) A carbon nano-fiber, metal nano-wire, metal oxide nano-wire or fiber, or conductive polymer nano-fiber, or (g) A combination thereof.

Although non-functionalized CNTs are not preferred nano-structured materials due to the high costs and other technical issues, CNTs (alone or in combination with another nano-structured material) can still be used in the presently invented partially surface-controlled lithium ion-exchanging battery. This can include a non-functionalized single-walled or multi-walled carbon nanotube (CNT), slightly oxidized CNT, fluorinated CNT, hydrogenated CNT, nitrogenated CNT, boron-doped CNT, nitrogen-doped CNT, or doped CNT. The nano-structured cathode material may include non-functionalized nano graphene, carbon nanotube, disordered carbon, or nano graphite, may simply provide a surface upon which lithium atoms can be deposited, e.g. via defect site trapping or benzene ring center capturing. The mere existence of a nano-structured material, even without a reactive functional group, can still provide a huge amount of lithium-storing surfaces. This non-functionalized surface is the lithium-storing surface in the present application.

The disordered carbon material may be formed of two phases with a first phase being graphite crystals or stacks of graphene planes and a second phase being non-crystalline carbon and wherein the first phase is dispersed in the second phase or bonded by the second phase. The disordered carbon material may contain less than 90% by volume of graphite crystals and at least 10% by volume of non-crystalline carbon.

The lithium source may be selected from lithium metal (e.g., in a thin foil or powder form, preferably stabilized or surface-passivated), a lithium metal alloy, a mixture of lithium metal or lithium alloy with a lithium intercalation compound, a lithiated compound, lithiated titanium dioxide, lithium titanate, lithium manganate, a lithium transition metal oxide, $Li_4Ti_5O_{12}$, or a combination thereof. Specifically, the lithium intercalation compound or lithiated compound may be selected from the following groups of materials: (a) Lithiated silicon (Si), germanium (Ge), tin (Sn), lead (Pb), antimony (Sb), bismuth (Bi), zinc (Zn), aluminum (Al), titanium (Ti), cobalt (Co), nickel (Ni), manganese (Mn), cadmium (Cd), and mixtures thereof; (b) Lithiated alloys or intermetallic compounds of Si, Ge, Sn, Pb, Sb, Bi, Zn, Al, Ti, Co, Ni, Mn, Cd, and their mixtures; (c) Lithiated oxides, carbides, nitrides, sulfides, phosphides, selenides, tellurides, or antimonides of Si, Ge, Sn, Pb, Sb, Bi, Zn, Al, Fe, Ti, Co, Ni, Mn, Cd, and mixtures or composites thereof; (d) Lithiated salts or hydroxides of Sn; and (e) Prelithiated graphite or prelithiated carbon material.

The electrolyte may be preferably selected from any of the electrolytes used in conventional lithium ion batteries or lithium metal batteries. The electrolyte is preferably liquid electrolyte or gel electrolyte. The electrolyte is preferably an organic electrolyte or a lithium salt-doped ionic liquid. In the battery device, the positive electrode preferably has a thickness greater than 5 μm, preferably greater than 50 μm, and more preferably greater than 100 μm.

In a preferred embodiment, in the super-battery, at least 90% of the lithium is stored on surfaces of the anode current collector when the device is in a charged state, or at least 90% of the lithium is stored on surfaces of the cathode active material (lithium being captured by cathode surfaces) when the device is in a discharged state.

The super-battery typically operates in a voltage range of from 1.0 volts to 4.5 volts, but can be prescribed to operate in a subset of this range (e.g. from 1.5 volts to 4.0 volts or from 2.0 volts to 3.9 volts, etc). It is also possible to operate above 4.5 volts, or slightly below 1.0 volts (although not preferred). It may be noted that a symmetric supercapacitor featuring an organic electrolyte can only operate up to 3.0 volts and typically operates from 0 to 2.7 volts. In contrast, a super-battery using exactly the same organic electrolyte typically operates from 1.5 volts to 4.5 volts. This is another piece of evidence that the super-battery and the supercapacitor are two fundamentally distinct classes of energy storage devices, operating on different mechanisms and principles.

It may be further noted that the open-circuit voltage of an EDLC supercapacitor is essentially zero volts when the cell is made and tested for the first time. In contrast, the open-circuit voltage of a super-battery is typically in the range of 1.0 volts-2.0 volts.

Preferably, the charge and/or discharge operation of the super-battery does not involve lithium intercalation or solid state diffusion. This is usually the case even if multi-layer graphene platelets are used in the cathode. Lithium intercalation into interstitial spaces between two graphene planes typically occur in a voltage below 1.5 volts (relative to Li/Li$^+$), mostly below 0.5 volts. The presently invented lithium ion-exchanging cell involves shuttling lithium ions between the surfaces of an anode current collector and surfaces of a cathode, which operates on the range of 1.5 volts to 1.5 volts.

Quite surprisingly, the super-battery provides an energy density typically of no less than 150 Wh/kg and power density no lower than 25 Kw/kg, all based on the total electrode weight. More typically, the battery device provides an energy density of greater than 300 Wh/kg and power density greater than 20 Kw/kg. In many cases, the battery device provides an energy density greater than 400 Wh/kg and power density greater than 10 Kw/kg. Most typically, the battery device provides an energy density greater than 300 Wh/kg or a power density greater than 100 Kw/kg. In some cases, the power density is significantly higher than 200 Kw/kg, or even higher than 400 Kw/kg, which is 1-3 orders of magnitude higher than the power densities (1-10 Kw/kg) of conventional supercapacitors.

In the presently invented super-battery, the positive electrode preferably has a thickness greater than 5 μm, more preferably greater than 50 μm, and most preferably greater than 100 μm.

The present invention also provides a method of operating a partially surface-mediated, lithium ion-exchanging cell (also referred to as a super-battery cell). The method includes implementing a lithium source at the anode and ionizing the lithium source to release lithium ions into the electrolyte during the first discharge cycle of the device. The method further includes electrochemically driving the released lithium ions onto the cathode where the released lithium ions are captured by the cathode active material surfaces. The method can further include a step of releasing lithium ions from the cathode surfaces during a re-charge cycle of the device, electrically driving the released lithium ions to the anode current collector surface using an external battery charging device.

Alternatively, the method may include implementing a lithium source at the cathode and operating the lithium source to release lithium ions into the electrolyte during the first charge cycle of the device.

The invention further provides a method of operating a partially surface-mediated energy storage device, which method includes: (A) Providing a partially surface-mediated cell comprising an anode, a lithium source, a porous separator, liquid or gel electrolyte, and a cathode, wherein the cathode has a non-functionalized material having lithium-capturing surfaces; (B) Releasing lithium ions from the lithium source during the first discharge of the device; (C) Exchanging lithium ions between an anode current collector surface and the lithium-capturing surfaces of the cathode during a subsequent charge or discharge. Preferably, both the charge and discharge of the device do not involve lithium intercalation or solid state diffusion.

The instant application discloses another method of operating a partially surface-mediated energy storage device. The method includes: (A) Providing a partially surface-mediated cell comprising an anode current collector, a lithium source, a porous separator, electrolyte (having an initial amount of lithium ions), and a cathode, wherein the cathode has a material having lithium-capturing surfaces in contact with the electrolyte; (B) Releasing lithium ions from the lithium source into the electrolyte during the first discharge of this device; (C) Operating the cathode to capture lithium ions from the electrolyte and store the captured lithium on cathode surfaces (preferably having a specific surface area of greater than 100 m$^2$/g, more preferably greater than 1,000 m$^2$/g, and most preferably greater than 2,000 m$^2$/g); and (D) Exchanging an amount of lithium ions (greater than the initial amount) between the anode current collector and the lithium-capturing surfaces of the cathode during a subsequent charge or discharge operation, wherein the charge operation involves no lithium intercalation.

DESCRIPTION OF THE PREFERRED EMBODIMENTS

Figure 1:
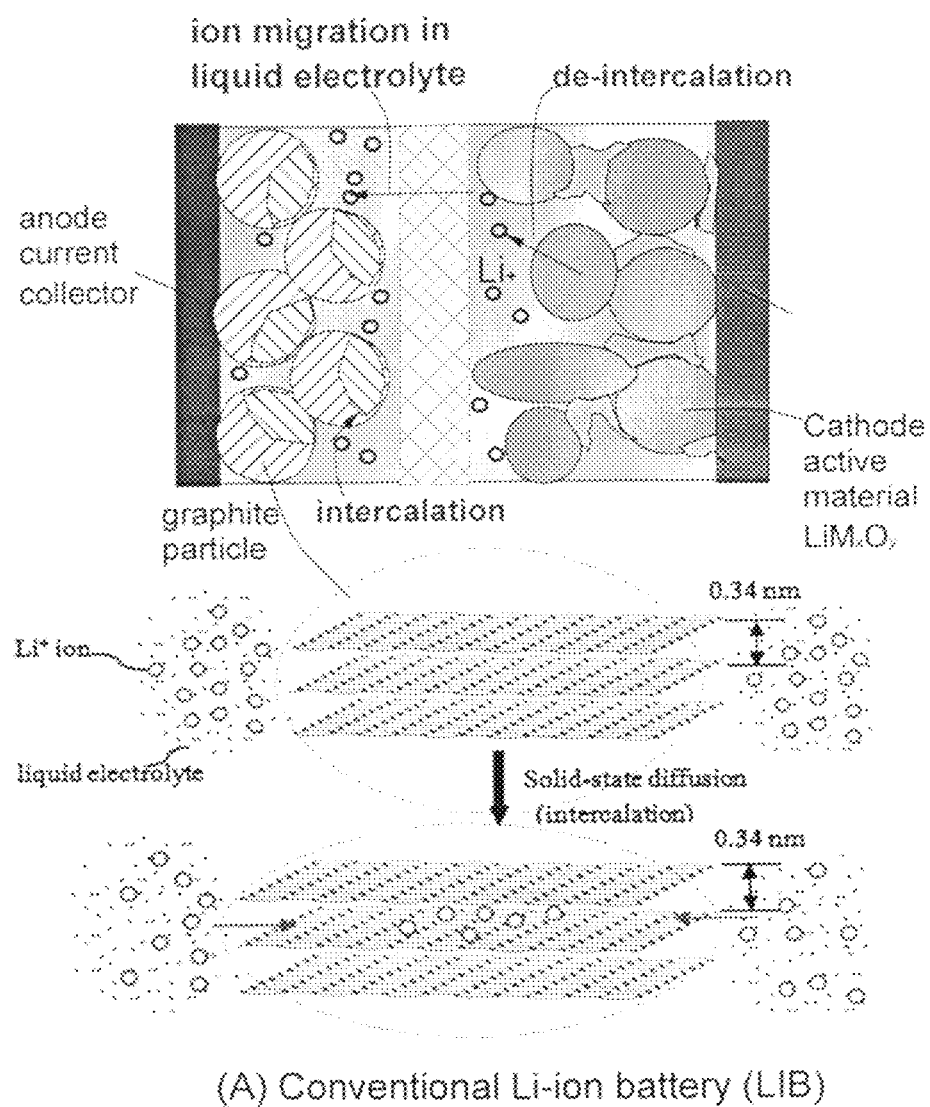
FIG. 1 (A) a prior art lithium-ion battery cell using graphite as an anode active material and lithium iron phosphate (or lithium cobalt oxide, etc) as a cathode active material; (B) a prior art EDL supercapacitor; (C) a prior art lithium-ion capacitor (LIC) with a prelithiated graphite anode and an activated carbon cathode; (D) a prior art lithium super-battery cell with a lithium foil anode and a cathode made of functionalized CNT; (E) a prior art lithium-ion capacitor with a lithium titanate as an anode active material and a cathode made of a functionalized CNT.
Figure 1:
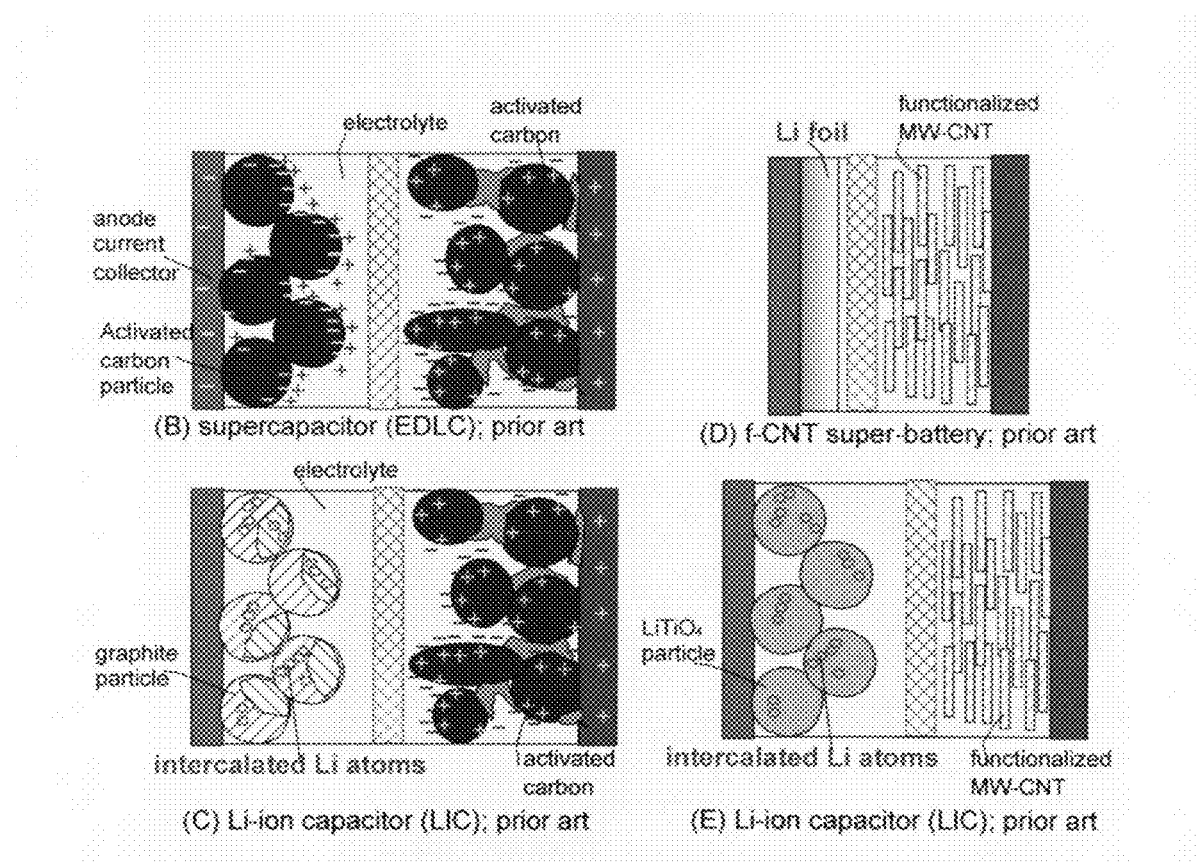

The present invention may be more readily understood by reference to the following detailed description of the invention taken in connection with the accompanying thawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting the claimed invention.

This invention provides an electrochemical energy storage device that is herein referred to as a partially surface-mediated, lithium ion-exchanging cell (or a super-battery). This super-battery device exhibits a power density significantly higher than the power densities of conventional supercapacitors and dramatically higher than those of conventional lithium ion batteries. This device exhibits an energy density comparable to that of a battery, and significantly higher than those of conventional supercapacitors.

This super-battery is composed of a positive electrode containing a non-functionalized material having a lithium-storing or lithium-capturing surface (the non-functionalized material being preferably nano-structured with nano-scaled or meso-scaled pores and great amounts of surface areas containing no chemical functional group, such as —$NH_2$ or —COOH, to form a redox pair with a lithium), a negative electrode containing an anode current collector, a porous separator disposed between the two electrodes, a lithium-containing electrolyte in physical contact with the two electrodes, and a lithium ion source implemented at the anode or the cathode. The lithium-capturing surface is in direct contact with electrolyte to capture lithium ions therefrom or to release lithium ions thereto. Preferred electrolyte types include organic liquid electrolyte, gel electrolyte, and ionic liquid electrolyte (preferably containing lithium ions), or a combination thereof, although one may choose to use aqueous or solid electrolytes.

The lithium ion source can be selected from a lithium chip, lithium foil, lithium powder, surface stabilized lithium particles, lithium film coated on a surface of an anode or cathode active material, or a combination thereof. In one preferred embodiment, the anode current collector is pre-lithiated, or pre-coated or pre-plated with lithium. In addition to relatively pure lithium metal, the lithium source may be selected from a lithium metal alloy, a mixture of lithium metal or lithium alloy with a lithium intercalation compound, a lithiated compound, lithiated titanium dioxide, lithium titanate, lithium manganate, a lithium transition metal oxide, $Li_4Ti_5O_{12}$, or a combination thereof. The lithium intercalation compound or lithiated compound may be selected from the following groups of materials: (a) Lithiated silicon (Si), germanium (Ge), tin (Sn), lead (Pb), antimony (Sb), bismuth (Bi), zinc (Zn), aluminum (Al), titanium (Ti), cobalt (Co), nickel (Ni), manganese (Mn), cadmium (Cd), and mixtures thereof; (b) Lithiated alloys or intermetallic compounds of Si, Ge, Sn, Pb, Sb, Bi, Zn, Al, Ti, Co, Ni, Mn, Cd, and their mixtures; (c) Lithiated oxides, carbides, nitrides, sulfides, phosphides, selenides, tellurides, or antimonides of Si, Ge, Sn, Pb, Sb, Bi, Zn, Al, Fe, Ti, Co, Ni, Mn, Cd, and mixtures or composites thereof, or (d) Lithiated salts or hydroxides of Sn.

Figure 3:
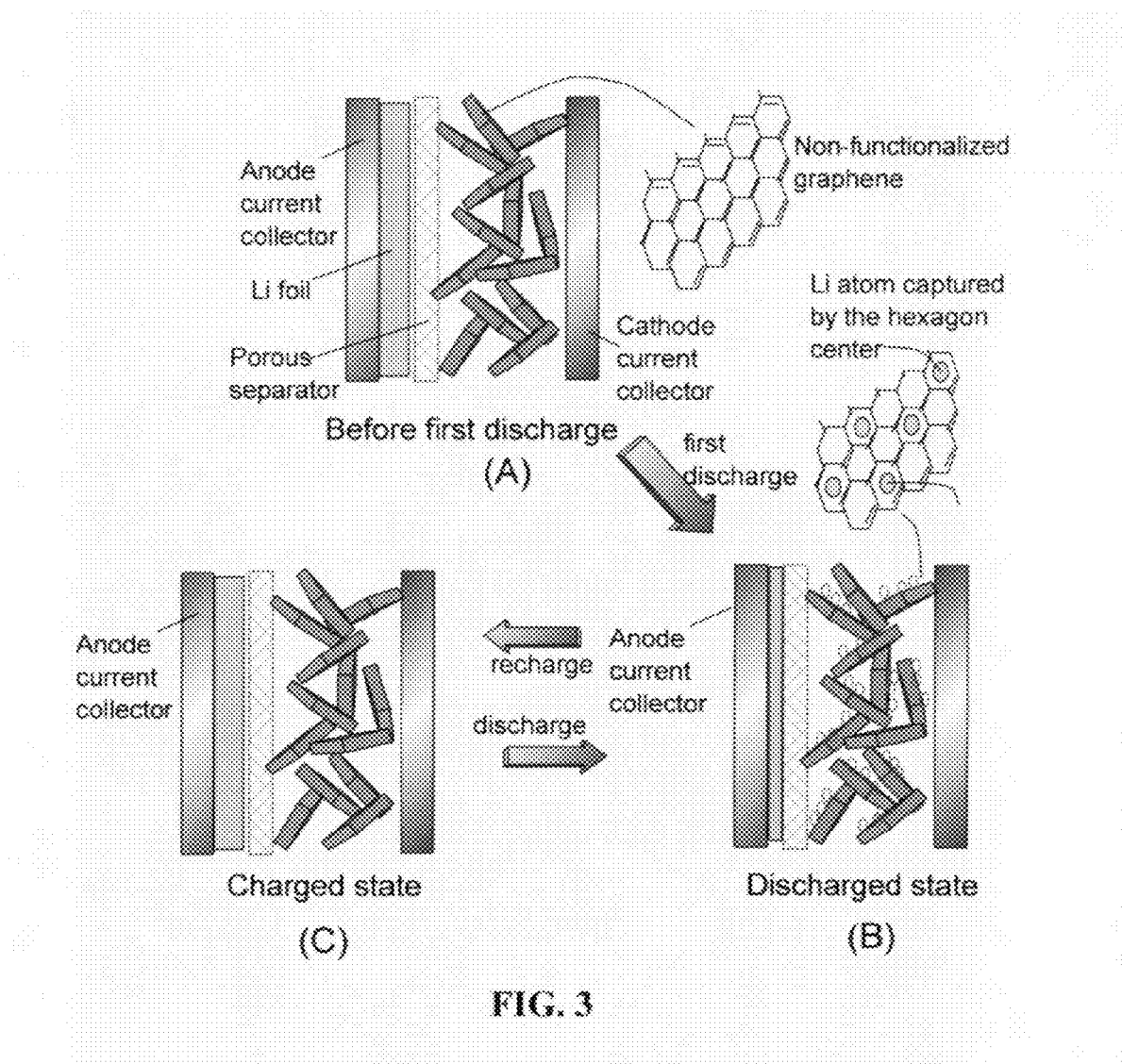
FIG. 3 (A) The structure of a super-battery cell when it is made (prior to the first discharge or charge cycle), containing all anode current collector, a lithium source (e.g. lithium foil or surface-stabilized lithium powder), a porous separator, liquid electrolyte, a nano-structured non-functionalized material at the cathode; (B) The structure of this device after its first discharge operation (lithium is ionized with the lithium ions diffusing through liquid electrolyte to reach the surfaces of nano-structured cathode and get rapidly captured by these surfaces); (C) The structure of this battery device after being re-charged (lithium ions are released from the cathode surfaces, diffusing through liquid electrolyte to reach the anode side and get rapidly plated onto the surface of the anode current collector or the surface of a layer of lithium).

Although there is no limitation on the electrode thickness, the presently invented positive electrode preferably has a thickness greater than 5 µm, more preferably greater than 50 µm, and most preferably greater than 100 µm. An example of such a partially surface-mediated, ion-exchanging battery device is given in FIG. 3.

Theoretical Aspects (Lithium Ion Diffusion Kinetics of Conventional Lithium-Ion Batteries, Lithium-Ion Capacitors, and Super-Batteries)

Not wishing to be constrained by any theory, but we would like to offer the following theoretical considerations that perhaps are helpful to the readers. We will provide some insight as to how a partially surface-mediated energy storage device operates and why such a lithium ion-exchanging battery exhibits exceptional power densities un-matched by conventional supercapacitors. We will also shed some light on why the electrode thickness of a lithium cell (including the partially surface-mediated lithium super-battery and conventional lithium-ion battery) plays such a critical role in dictating the power density in such a dramatic manner.

The internal structure of a conventional lithium-ion battery may be schematically shown in FIG. 1(A). In a battery discharge situation, lithium ions must diffuse (de-intercalate) out from the bulk of an anode active material particle, such as graphite, silicon, and lithium titanate (particle diameter=$d_a$ and the average solid-state diffusion distance=$d_a/2$), and then migrate in liquid electrolyte across the anode thickness (anode layer thickness=La and the average diffusion distance=La/2). Subsequently, lithium ions must move (in liquid electrolyte) across a porous separator (thickness=Ls), diffuse across part of the cathode thickness (thickness=Lc) in liquid electrolyte to reach a particular cathode active material particle (average diffusion distance=Lc/2), and then diffuse into (intercalate) the bulk of a particle (diameter=$d_c$ and the average solid-state diffusion distance required=$d_c/2$). In a re-charge situation, the lithium ions move in the opposite direction, but must travel approximately the same distances.

In other words, the operation of a conventional lithium-ion battery involves de-intercalation of lithium ions from the bulk (not the surface) of an electrode active material particle in one electrode (e.g., anode, during discharge) and inter-calation of lithium ions into the bulk of an electrode active material particle in the opposite electrode (e.g. cathode). In general, diffusion through a liquid electrolyte is fast, but diffusion through a solid is dramatically slower (by 3-8 orders of magnitude). The presently invented partially surface-mediated cell operates essentially on the exchange of massive lithium ions between the anode current collector surface and surfaces of the nano-structured cathode (and not in the bulk of the electrode, as in lithium-ion batteries). This strategy completely removes the need for the time-consuming process of lithium intercalation and de-intercalation. The super-battery is essentially intercalation-free, with most of the lithium being captured by and stored on the massive surface areas of the cathode active material. Typically >90% of lithium atoms are captured on graphene surfaces, and more typically less than 1% of lithium could accidentally enter the interior elf a multi-layer graphene structure (since the super-battery is typically operated between 1.5 and 4.5 volts). The charge/discharge time of a super-battery is limited only by the migration of lithium ions through liquid electrolyte (organic or ionic liquid), which is very fast and results in ultra-high power densities unmatched even by the supercapacitors (which are noted for their high power densities). This is further explained in what follows:

Assume that the diffusion coefficient of Li ions in a particular medium is D and a required travel distance is x, then the required diffusion time can be approximated as $t \sim x^2/D$, according to a well-known kinetics equation. As a first-order of approximation, the total required time scale for a lithium ion to complete a charge or discharge process may be estimated as:

$$t_{total}=(La/2)^2/D_{electrolyte}+(d_a/2)^2/D_a+(LS)^2/D_s+(Lc/2)^2/D_{electrolyte}+(d_c/2)^2/D_c \quad (1)$$

where $D_{electrolyte}$=Li ion diffusion coefficient in electrolyte, $D_a$=Li ion diffusion coefficient in an anode active material particle, $D_s$=Li ion diffusion coefficient through a porous separator, and $D_c$=Li ion diffusion coefficient in a cathode active material particle.

Representative diffusion coefficients of $Li^+$ in or through various liquid mediums or solid membrane or particles are given below (based on open literature data): liquid electrolyte ($2\times10^{-6}$ cm$^2$/s); separator ($7.5\times10^7$ cm$^2$/s); LiFePO$_4$ cathode ($10^{-13}$ cm$^2$/s); Li$_3$V$_2$(PO$_4$)$_3$ cathode ($10^{-13}$ to $10^{-9}$ cm$^2$/s); nano-Si anode ($10^{-12}$ cm$^2$/s); graphite anode ($1$-$4\times10^{-10}$ cm$^2$/s); and Li$_4$Ti$_5$O$_{12}$ anode ($1.3\times10^{-11}$ cm$^2$/s). This implies that, for a conventional lithium ion battery cell wherein LiFePO$_4$ particles are used as a cathode active material, the final term, $(d_c/2)^2/D_c$, in Eq. (1) dominates the required total diffusion time due to its excessively low diffusion coefficient. Actually, the value of diffusion coefficient varies between $10^{-10}$ and $10^{-16}$ cm$^2$/s, depending on the lithium content in solid solution Li$_x$FePO$_4$ and Li$_{1-x}$FePO$_4$ (X<0.02) or the LiFePO$_4$/FePO$_4$ phase ratio.

In contrast, in a super-battery (partially surface-mediated) cell containing a meso-porous cathode of a non-functionalized or functionalized nano carbon material (e.g., graphene, CNT, or disordered carbon) and a lithium metal foil as the anode (schematically illustrated in FIG. 1(C)), Li ions do not have to diffuse through a solid-state cathode particle and, hence, are not subject to the limitation by a low solid-state diffusion coefficient at the cathode (e.g. $10^{-13}$ cm$^2$/s in a LiFePO$_4$ particle). Instead, the cathode active materials are highly porous, allowing liquid electrolyte to reach the interior of the pores where active surfaces are present to readily and reversibly capture lithium ions that diffuse into these pores through a liquid medium (not a solid medium) with a high diffusion coefficient (e.g., $2\times10^{-6}$ cm$^2$/s). In such a super-battery, the final trim, $(d_c/2)^2/D_c$, in Eq. (1) is practically non-existing. The required total diffusion time is now dictated by the thicknesses of the electrodes and the separator. The above discussion is based on the premise that the reversible capturing step between an active surface and a lithium ion in the electrolyte is fast, and the whole charge-discharge process is not reaction-controlled. This has been always the case.

Figure 2:
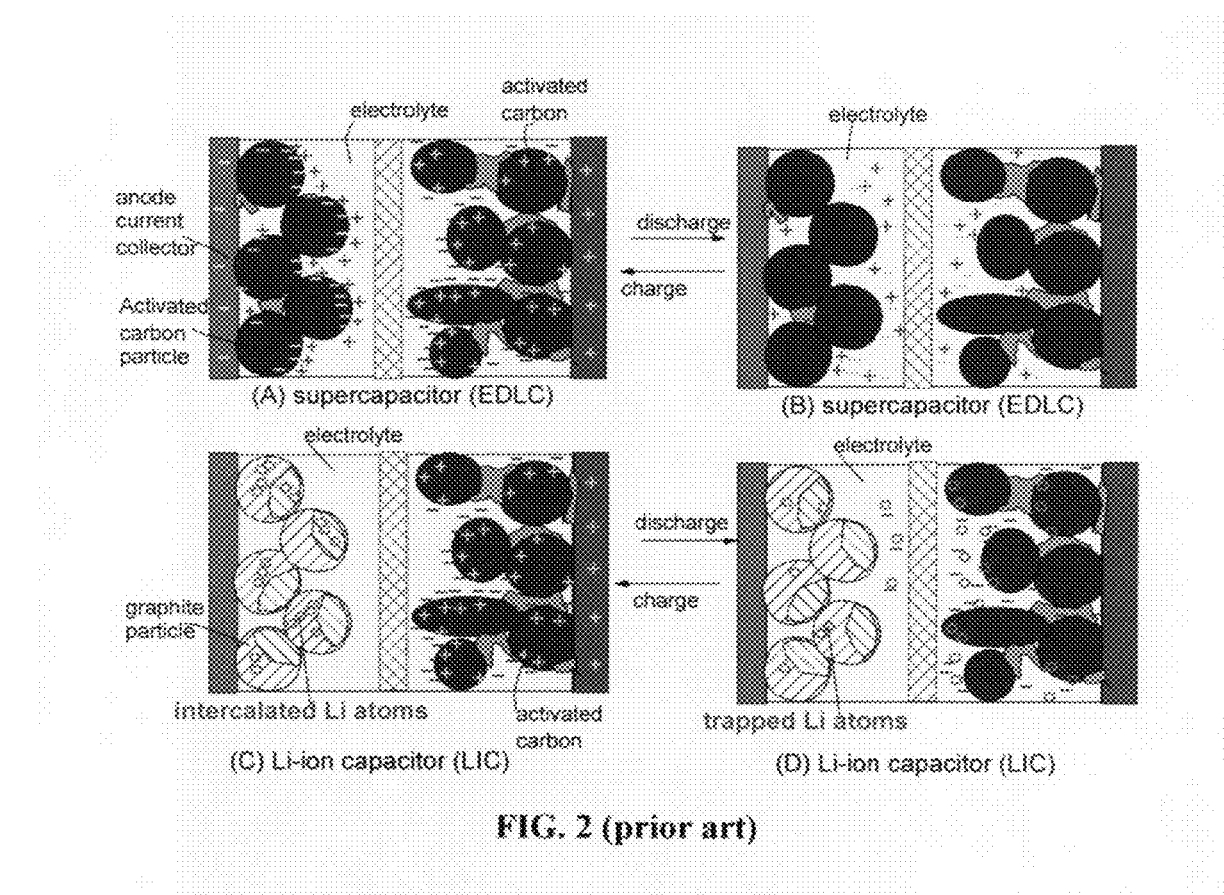
FIGS. 2 (A) and (B) are for illustrating the charged and discharged state, respectively, of a prior art EDL supercapacitor; and (C) and (D) are for illustrating the charged and discharged state, respectively, of a prior art lithium-ion capacitor (LIC).

In a prior art lithium-ion capacitor (LIC), the cathode is a meso-porous structure of a nano carbon material (e.g., activated carbon), but lithium titanate or graphite particles constitute the anode (schematically illustrated in FIGS. 2(C) and 2(D)). In a cell discharge situation, lithium ions must diffuse out of lithium titanate particles or graphite particles (a slow de-intercalation step), and then migrate in liquid electrolyte across the anode thickness. Subsequently, lithium ions must move (in liquid electrolyte) across a porous separator, diffuse across part of the cathode thickness in liquid electrolyte to reach a location close to a surface area of a nano-structured cathode active material. There is no need for solid-state diffusion at the cathode side. The whole process is essentially dictated by the solid-state diffusion at the anode. Hence, this LIC should exhibit a slower kinetic process (hence, a lower power density) as compared to the super-battery (partially surface-mediated).

By plugging representative values of the various parameters in Eq.(1) we obtain the total lithium migration time required of a battery charge or discharge process for several conventional lithium-ion battery types and several lithium super-battery cells and LICs. The first group is a conventional lithium-ion battery with a graphite particle anode and lithium iron phosphate cathode (Gr/LiFePO$_4$). The second and third groups are both conventional Li-ion batteries with a LiFePO$_4$ cathode and a Si particle- or lithium titanate-based anode, respectively (Nano-Si/LiFePO$_4$ and Li$_4$Ti$_5$O$_{12}$/LiFePO$_4$). The fourth group is a LIC (Li$_4$Ti$_5$O$_{12}$/f-CNM) where the anode is composed of Li$_4$Ti$_5$O$_{12}$ particles and the cathode is functionalized carbon nano material (f-CNM), such as CNT or activated carbon (AC). The fifth group is a partially surface-mediated cell (Li foil/f-CNM) where the anode is a lithium foil and the cathode is a carbon nano material. These data are shown in Table 1(a) and (b) below:

TABLE 1(a)

Parameters used in the present calculations (CNM = carbon nano materials, including carbon nanotubes (CNTs), nano graphene platelets (NGPs), disordered carbon, etc; Gr = graphite).

| Cell Type (Anode/Cathode) | $D_{li}$ in Electrolyte cm$^2$/s | La (um) | Anode Particle Dia., da (um) | $D_{li}$ in anode particle cm$^2$/s | Sep. thick. (um) | $D_{li}$ in separator cm$^2$/s | Lc (um) | Cathode particle Dia., dc (um) | $D_{li}$ in cathode particle cm$^2$/s | Total diffusion time (sec) |
|---|---|---|---|---|---|---|---|---|---|---|
| Gr/LiFePO$_4$ | 1.00E−06 | 200 | 20 | 2.00E−10 | 100 | 7.50E−07 | 200 | 1 | 1.0E−13 | 3.02E+04 |
| Gr/LiFePO$_4$-nano | 1.00E−06 | 200 | 20 | 2.00E−10 | 100 | 7.50E−07 | 200 | 0.1 | 1.0E−13 | 5.48E+03 |
| Gr/LiFePO$_4$-nano | 1.00E−06 | 200 | 1 | 2.00E−10 | 100 | 7.50E−07 | 200 | 0.1 | 1.0E−13 | 4.96E+02 |
| Nano-Si/LiFePO$_4$ | 1.00E−06 | 200 | 0.1 | 1.00E−12 | 100 | 7.50E−07 | 200 | 0.1 | 1.0E−13 | 5.08E+02 |
| Li$_4$Ti$_5$O$_{12}$/LiFePO$_4$ | 1.00E−06 | 200 | 0.1 | 1.30E−11 | 100 | 7.50E−07 | 200 | 0.1 | 1.0E−13 | 4.85E+02 |

TABLE 1(a)-continued

Parameters used in the present calculations (CNM = carbon nano materials, including carbon nanotubes (CNTs), nano graphene platelets (NGPs), disordered carbon, etc; Gr = graphite).

| Cell Type (Anode/Cathode) | $D_{li}$ in Electrolyte $cm^2/s$ | La (um) | Anode Particle Dia., da (um) | $D_{li}$ in anode particle $cm^2/s$ | Sep. thick. (um) | $D_{li}$ in separator $cm^2/s$ | Lc (um) | Cathode particle Dia., dc (um) | $D_{li}$ in cathode particle $cm^2/s$ | Total diffusion time (sec) |
|---|---|---|---|---|---|---|---|---|---|---|
| $Li_4Ti_5O_{12}$/$LiFePO_4$ | 1.00E−06 | 100 | 0.05 | 1.30E−11 | 50 | 7.50E−07 | 100 | 0.05 | 1.0E−13 | 1.21E+02 |
| $Li_4Ti_5O_{12}$/f-CNM | 1.00E−06 | 200 | 0.1 | 1.30E−11 | 100 | 7.50E−07 | 200 | 0.1 | 1.0E−6 | 2.35E+02 |
| $Li_4Ti_5O_{12}$/f-CNM | 1.00E−06 | 20 | 0.1 | 1.30E−11 | 20 | 7.50E−07 | 20 | 0.1 | 1.0E−6 | 5.26E+00 |
| $Li_4Ti_5O_{12}$/f-CNM | 1.00E−06 | 2 | 0.1 | 1.30E−11 | 2 | 7.50E−07 | 2 | 0.1 | 1.0E−6 | 1.96E+00 |
| $Li_4Ti_5O_{12}$/f-CNM | 1.00E−06 | 2 | 0.1 | 1.30E−11 | 2 | 1.00E−06 | 0.2 | 0.1 | 1.0E−6 | 1.94E+00 |
| Li foil/f-CNM | 1.00E−06 | 10 | 0 | 1.30E−11 | 10 | 7.50E−07 | 0.3 | 0.1 | 1.0E−6 | 5.84E−01 |
| Li foil/f-CNM | 1.00E−06 | 10 | 0 | 1.30E−11 | 10 | 7.50E−07 | 3 | 0.1 | 1.0E−6 | 6.06E−01 |
| Li foil/f-CNM | 1.00E−06 | 30 | 0 | 1.30E−11 | 10 | 7.50E−07 | 30 | 0.1 | 1.0E−6 | 4.83E+00 |
| Li foil/f-CNM | 1.00E−06 | 30 | 0 | 1.30E−11 | 10 | 7.50E−07 | 200 | 0.1 | 1.0E−6 | 1.03E+02 |

TABLE 1(b)

The required diffusion time to reach a particle in the anode ($t_{La}$), diffusion in the anode particle (ta), diffusion time through the separator (ts), diffusion time to reach a cathode particle ($t_{Lc}$), and the diffusion time in the cathode particle (tc).

| $t_{La}$ (sec) | Ta (sec) | Ts (sec) | $t_{Lc}$ (sec) | Tc (sec) | Total time (sec) | Total time (hours) | Cell type |
|---|---|---|---|---|---|---|---|
| 1.00E+02 | 5.00E+03 | 3.33E+01 | 1.00E+02 | 1.39E+05 | 3.02E+04 | 8.40 | Gr/$LiFePO_4$ |
| 1.00E+02 | 5.00E+03 | 3.33E+01 | 1.00E+02 | 1.39E+03 | 5.48E+03 | 1.52 | Gr/$LiFePO_4$-nano |
| 1.00E+02 | 1.25E+01 | 3.33E+01 | 1.00E+02 | 1.39E+03 | 4.96E+02 | 0.138 | Gr/$LiFePO_4$-nano |
| 1.00E+02 | 2.50E+01 | 3.33E+01 | 1.00E+02 | 1.39E+03 | 5.08E+02 | 0.141 | Nano-Si/$LiFePO_4$-n |
| 1.00E+02 | 1.92E+00 | 3.33E+01 | 1.00E+02 | 1.39E+03 | 4.85E+02 | 0.135 | $Li_4Ti_5O_{12}$/$LiFePO_4$-n |
| 2.50E+01 | 4.81E−01 | 8.33E+00 | 2.50E+01 | 3.47E+02 | 1.21E+02 | 0.00337 | $Li_4Ti_5O_{12}$/$LiFePO_4$-n |
| 1.00E+02 | 1.92E+00 | 3.33E+01 | 1.00E+02 | 2.50E−05 | 2.35E+02 | 6.53E−02 | $Li_4Ti_5O_{12}$/f-CNM |
| 1.00E+00 | 1.92E+00 | 1.33E+00 | 1.00E+00 | 2.50E−05 | 5.26E+00 | 1.46E−03 | $Li_4Ti_5O_{12}$/f-CNM |
| 1.00E−02 | 1.92E+00 | 1.33E−02 | 1.00E−02 | 2.50E−05 | 1.96E+00 | 5.43E−04 | $Li_4Ti_5O_{12}$/f-CNM |
| 1.00E−02 | 1.92E+00 | 1.00E−02 | 1.00E−04 | 2.50E−05 | 1.94E+00 | 5.40E−04 | $Li_4Ti_5O_{12}$/f-CNM |
| 2.50E−01 | 0.00E+00 | 3.33E−01 | 2.25E−04 | 2.50E−05 | 5.84E−01 | 1.62E−04 | Li foil/f-CNM |
| 2.50E−01 | 0.00E+00 | 3.33E−01 | 2.25E−02 | 2.50E−05 | 6.06E−01 | 1.68E−04 | Li foil/f-CNM |
| 2.25E+00 | 0.00E+00 | 3.33E−01 | 2.25E+00 | 2.50E−05 | 4.83E+00 | 1.34E−03 | Li foil/f-CNM |
| 2.25E+00 | 0.00E+00 | 3.33E−01 | 1.00E+02 | 2.50E−05 | 1.03E+02 | 2.85E−02 | Li foil/f-CNM |

Several significant observations can be made from the data of Table 1(a) and (b):

(1) Conventional lithium ion batteries (first group above) featuring a micron-sized graphite particle anode (graphite diameter=20 μm) and a micron-sized $LiFePO_4$ cathode (particle diameter=1 μm) would require several hours (e.g. 8.4 h) to complete the required lithium ion diffusion process. This is why conventional lithium ion batteries exhibit very low power densities (typically 100-500 W/Kg) and very long re-charge times.

(2) For a prior art lithium-ion capacitor (LIC) featuring a carbon cathode (e.g. activated carbon or f-CNT) and an anode of $Li_4Ti_5O_{12}$ nano particles, the required diffusion times are between 235 sec (<4 minutes) for a cathode thickness of 200 μm and 1.96 sec for an ultra-thin cathode (e.g., 0.3 μm LBL f-CNT as prepared by the layer-by-layer method of the MIT research group [S. W. Lee, et al, *Nature Nanotechnology*, 5 (2010) 531-537]). Unfortunately, such an ultra-thin electrode (0.3-3 μm) is of extremely limited utility value.

(3) For the lithium super-batteries (partially surface-mediated), the electrode thickness is a dominating factor. For instance, in the case of using lithium metal foil as the anode (Type-1 super-battery), the total diffusion time can be as short as <0.6 sec (when the cathode thickness is 0.3 μm or 3 μm), which increases to 103 sec (still less than 2 minutes) when the cathode thickness is 200 μm.

(4) The above observations imply that the lithium super-batteries should have an extraordinary power density, particularly when the electrodes are ultra-thin. This is why Lee, et al. at MIT were able to report a power density of 100 Kw/Kg for their lithium super-battery cells having a LBL f-CNT cathode of 0.3 μm thick and a lithium foil anode. However, a useful electrode size is at least 50 μm in thickness (typically between 100 and 300 μm) and, again, the cells with a cathode thickness of 0.3-3.0 μm have very limited practical utility value. The exceptionally high power densities observed for the lithium super-batteries with a LBL f-CNT cathode reported by Lee, et al are due to the ultra-thin cathode thickness (0.3 μm). As shown in FIG. 8, our graphene-based partially surface-mediated cells (typically having an electrode thickness of 100-300 μm) perform even better than the thin electrode-based LBL f-CNT cell (also partially surface mediated).

It may be noted that, for the lithium super-battery discussed above, the anode has a current collector and a lithium foil as a lithium ion source, and there is no other anode active material in a particulate form and, hence, no particle diameter ($d_a$ was assigned as zero in the above calculation). During the first discharge, Li foil is electrochemically ionized to release ions.

An alternative form of the surface-mediated cell (Type-2 super-battery) contains a lithiated compound or lithium-intercalation compound implemented at the anode as a lithium source, not as an anode active material (or implemented at the cathode, but not serving as a cathode active material). During the first discharge of such a super-battery (e.g. having graphite particles pre-intercalated with lithium), a majority of the lithium stored in this lithiated compound can be extracted out using a properly selected first discharge voltage range. This amount of lithium is then fully captured by the massive graphene surfaces at the cathode. During the subsequent re-charge (and the many discharge/charge cycles that follow), the operating voltage range of such a super-battery is limited to the range from 1.5 volts to 4.5 volts. The utilization of this second voltage range as the actual cell operating range for an end-user (e.g. a consumer of a super-battery used in a mobile phone) would prevent the returning lithium ions at the anode (during re-charge) from undergoing intercalation into the bulk of a graphite particle. The returning lithium ions are simply electro-chemically plated onto the anode current collector and the surfaces of these graphite particles. Since lithium ionization and surface deposition are fast processes, this second type of super-battery exhibits a high power density. Furthermore, due to the full utilization of the originally pre-loaded lithium, the amount of lithium ions that can be exchanged between the anode surfaces and cathode active material surfaces (e.g. non-functionalized graphene) can be huge.

By contrast, the operation of prior art lithium-ion capacitors (e.g. those LICs having a prelithiated graphite anode and activated carbon cathode) is limited to 2.2 volts and 3.8 volts and the amount of lithium ions that can be exchanged between the anode and the cathode has been very low, typically lower than that of a super-battery by a factor of 5-10. Such a huge difference in performance between a conventional LIC and a Type-2 super-battery of the present invention is due to material composition differences in the electrode(s), and the differences in operating methods. This super-battery strategy (using a graphene cathode, and a different operating voltage range) has been most novel and innovative, and the results have been most surprising.

Partially Surface-Controlled Battery Device Versus Prior Art Supercapacitors

This new partially surface-mediated, lithium ion-exchanging battery device is also patently distinct from the conventional supercapacitor in the following aspects:

(1) The conventional or prior art supercapacitors do not have a lithium ion source implemented at the anode when the cell is made.
(2) The electrolytes used in these prior art supercapacitors are mostly lithium-free or non-lithium-based. Even when a lithium salt is used in a supercapacitor electrolyte, the solubility of lithium salt in a solvent essentially sets an upper limit on the amount of lithium ions that can participate in the formation of electric double layers of charges inside the electrolyte phase (near but not on an electrode material surface, as illustrated in FIGS. 2(A) and 2(B)). As a consequence, the specific capacitance and energy density of the resulting supercapacitor are relatively low (e.g. typically <6 Wh/kg based on total cell weight), as opposed to, for instance, 160 Wh/kg (based on total cell weight) of the presently invented surface-mediated cells.
(3) The prior art supercapacitors are based on either the electric double layer (EDL) mechanism or the pseudo-capacitance mechanism to store their charges. In both mechanisms, no massive lithium ions are exchanged between the two electrodes (even when a lithium salt is used in electrolyte). There are equal amounts of cations and anions that participate in the charge storage. When an EDL supercapacitor is charged, for instance, the activated carbon particle surfaces at the anode are negatively charged which attract the cations (e.g. $Li^+$ if lithium salt is used in the electrolyte) to the anode side and these cations form electric double layers of charges near the surfaces of an electrode active material (but not on the surface). The cations are not captured or stored in or on the surfaces of the electrode active material. Similarly, the negatively charged activated carbon particles at the cathode attract the anions (e.g. $PF_6^-$) to the cathode side, also forming an electric double layer near the cathode material surface.

In contrast, when a super-battery of the present invention is charged, essentially all of the lithium ions are electroplated back to the surface of the anode current collector or a surface of the remaining lithium source, as illustrated in FIG. 3(C). This is a surface deposition process and the surface can accommodate a thick layer of lithium atoms (not ions).

(4) When a supercapacitor is discharged, the cations move away from the anode material surface and the anions move away from the cathode material surface, but both cations and anions are simply randomly distributed in the electrolyte (normally with one cation staying nearby an anion). The cations (e.g. $Li^+$) do not move all the way back to the cathode side. They are practically everywhere in the electrolyte phase.

In contrast, using graphene as an example of a cathode active material in a partially surface-mediated cell of the present invention, massive lithium ions are ionized from the lithium source or anode current collector surface, migrate all the way through the liquid electrolyte to the cathode side, and get captured by or trapped at the defect sites, graphene edges, or benzene ring centers of a graphene plane. In our co-pending application (U.S. patent application Ser. No. 12/928,927), functional groups on graphene surfaces are used to capture lithium. In the instant application, a non-functionalized material (having no functional group) with high surface areas in direct contact with liquid electrolyte use the benzene ring centers and surface defects of graphene sheets to capture lithium ions from electrolyte (FIGS. 4(D) and 4(E)). These active sites of graphene have essentially removed lithium ions out of the liquid phase.

Figure 5:
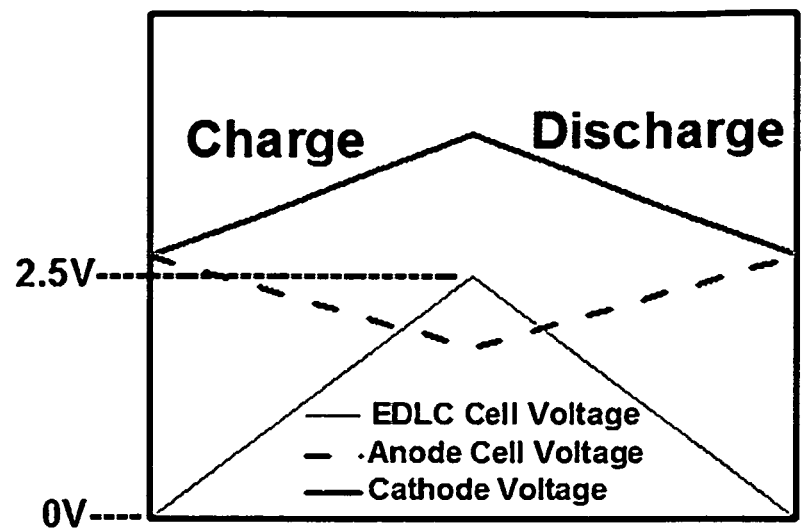
FIG. 5 The electrochemical potential of the anode, the cathode, and the cell for (A) a symmetric supercapacitor (EDLC) and (B) a lithium-capacitor during a charge and discharge cycle.
Figure 5:
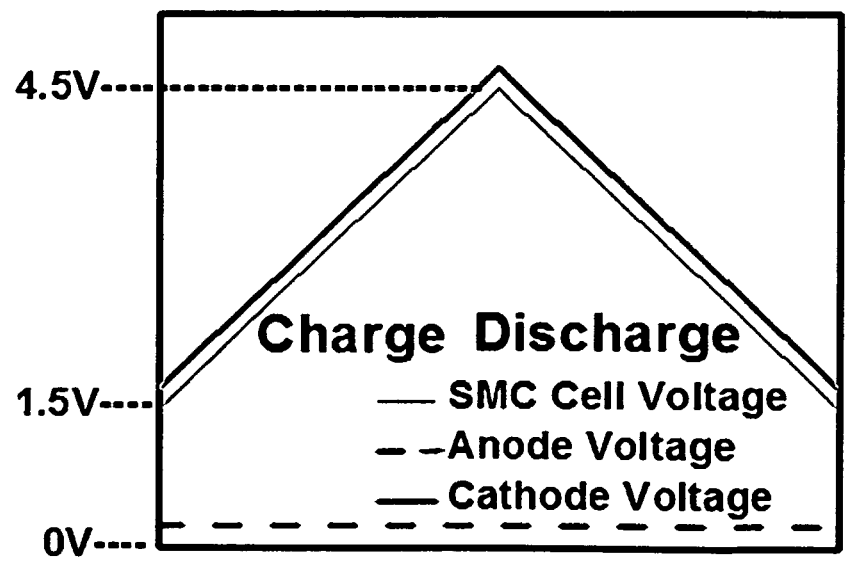

(5) The prior art symmetric supercapacitors (EDL supercapacitors) using a lithium salt-based organic electrolyte operate only in the range of 0-3 volts (more typically 0-2.5 volts). They cannot operate above 3 volts; there is no additional charge storing capability beyond 3 volts and actually the organic electrolyte typically begins to break down at 2.7 volts. In contrast, the partially surface-mediated cells of the present invention operate typically in the range of 1.0-4.5 volts, most typically in the range of 1.5-4.5 volts), but preferably in the range of 1.5-4.0 volts. These two ranges of operating voltage are reflections of totally distinct charge storage mechanisms. Even though, on the paper, there appears to be an overlap of 1.5-3.0 volts between these two voltage ranges (range of 1-3 and range of 1.5-4.5 volts), this overlap is artificial, sheer coincidental, and not scientifically meaningful since the charge storage mechanisms are fundamentally different.
(6) The prior art EDL supercapacitors typically have an open-circuit voltage of 0 or nearly zero volt. In contrast, the super-battery typically has an open-circuit voltage of >0.6 volts, more commonly >1.0 volts, and most commonly >1.5 volts. Most significantly, when a supercapacitor is in a discharged state or when the cell is made (e.g., as illustrated in FIG. 5(A)), the anode and the cathode are at identical electrochemical potential, both being significantly higher than 2.0 volts with respect to Li/Li$^+$. As an organic electrolyte-based supercapacitor cell is charged, the cathode becomes increasingly more positive and the anode becomes more negative, and the resulting cell voltage (which is the difference between these two electrochemical potential values) becomes greater and greater, reaching an upper limit of typically 2.5-2.7 volts.

When the supercapacitor is discharged, the cathode potential decreases and anode increases. As a result, the cell voltage continues to decrease until it drops to essentially 0 volt. In contrast, the anode chemical potential in a super-battery remains essentially constant (near 0 volt) throughout the charge or discharge process. But the cathode electrochemical potential varies between approximately 1.5 volts and 4.5 volts, as illustrated in FIG. 5(B). Hence, the super-battery cell also operates in a voltage range of approximately LS volts and 4.5 volts.

Charge Storage Mechanisms and Energy Density Considerations

Not wishing to be limited by theory, but we think that the specific capacity of an electrode in a partially surface-mediated, Li-ion exchanging cell is governed by the number of active sites on graphene surfaces of a nano-structured carbon material at the cathode that are capable of capturing lithium ions therein or thereon. The nano-structured carbon material may be selected from activated carbon (AC), carbon black (CB), hard carbon, soft carbon, exfoliated graphite (EG), and isolated graphene sheets (nano graphene platelet or NGP) from natural graphite or artificial graphite. These carbon materials have a common building block—graphene or graphene-like aromatic ring structure. We think that there are four possible lithium storage mechanisms:

Mechanism 1: The geometric center of a benzene ring in a graphene plane is an active site for a lithium atom to adsorb onto;

Mechanism 2: The defect site on a graphene sheet is capable of trapping a lithium ion;

Mechanism 3: The cations (Li$^+$) and anions (from a Li salt, such as PF6$^-$) in the liquid electrolyte are capable of forming electric double layers of charges near the electrode material surfaces;

Mechanism 4: A functional group on a graphene surface/edge can form a redox pair with a lithium ion. This mechanism does not operate in the presently invented super-capacitor cell since there is no functional group at the cathode.

Surface Bonding Mechanism (Mechanism 1):

Lithium atoms are capable of forming stable interactions with C atoms on a graphene plane when electrolyte is not present to compete for lithium. The Li—C bond in such a layer (without a functional group) would not result in an sp$^2$ to an sp$^3$ transition of carbon orbitals. Energy calculations have indicated the possible stability of such Li atom-adsorbed graphene layers (with lithium atoms bonded to the centers of benzene rings of a graphene plane) without the presence of electrolyte. We have surprisingly observed that the Li-bonded graphene layer (FIG. 4(D)) can be spontaneously formed in the presence of electrolyte. This was unexpected since lithium ions have excellent chemical compatibility with other ingredients in the electrolyte (this is why they naturally exist in the electrolyte) and these ingredients (e.g. solvent) would compete against the graphene surface for trying to keep the lithium ions in the solvent phase, as opposed to being "high-jacked" by graphene surface. The bonding between lithium atoms and graphene surface has been most surprisingly strong.

Figure 4:
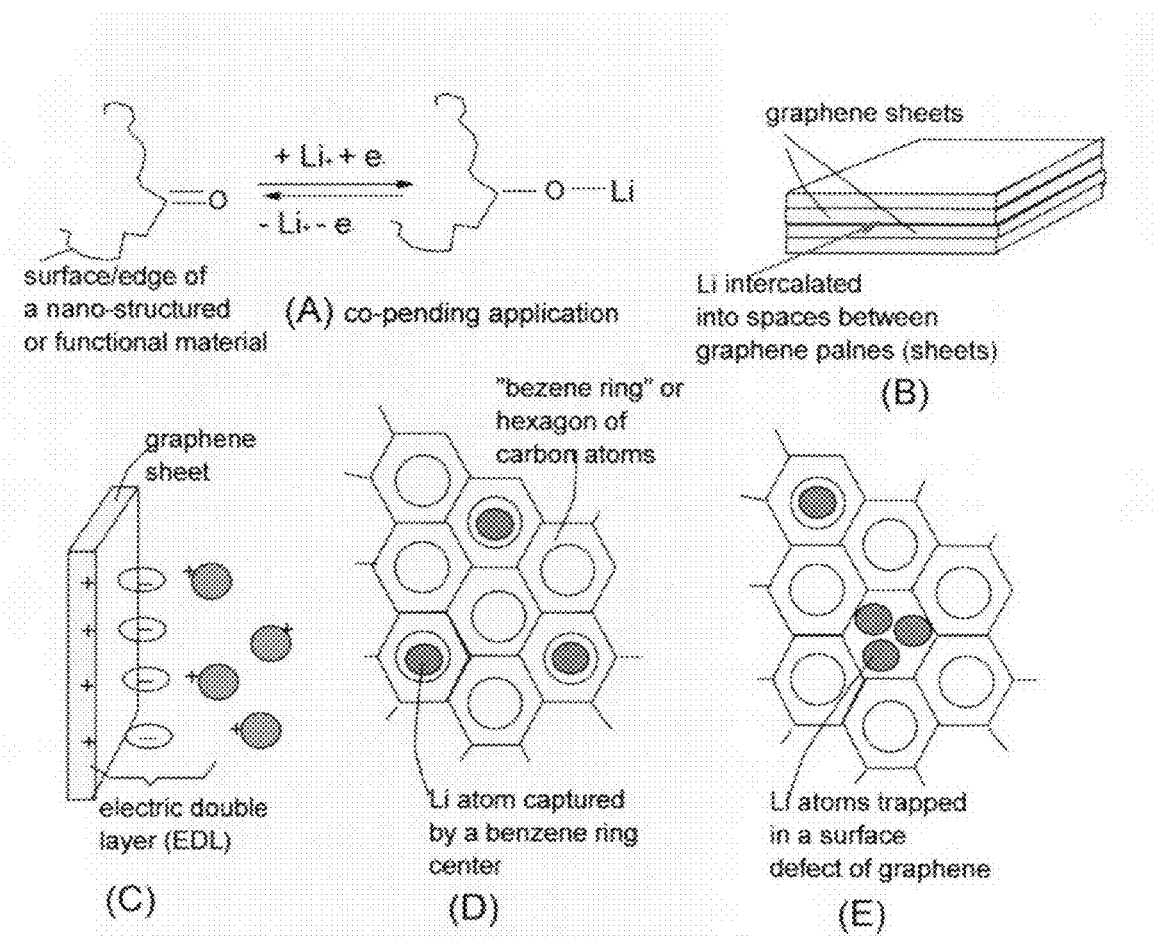
FIG. 4 (A) Schematic of a lithium storage mechanism disclosed in a co-pending application (the functional group attached to an edge or surface of an aromatic ring or small graphene sheet can readily react with a lithium ion to form a redox pair); (B) Possible formation of electric double layers as a minor or negligible mechanism of charge storage; (C) A major lithium storage mechanism (lithium captured at a benzene ring center of a graphene plane), which is fast, reversible, and stable; (D) Another major lithium storage mechanism (lithium atoms trapped in a graphene surface defect).

Lithium Ion Trapping at Defect Sites (Mechanism 2):

Active defects such as edges and vacancies (e.g. FIG. 4(E)) in carbonaceous materials might be capable of accommodating additional Li. There are a large number of these defects or disorder sites in NGPs inevitably induced by the oxidation and reduction processes commonly used for graphene production.

Electric Double Layer (EDL) (Mechanism 3):

The super-battery electrolyte is typically composed of a lithium ion salt dissolved in a solvent. The electrolytic salts can be selected from lithium perchlorate (LiClO$_4$), lithium hexafluorophosphate (LiPF$_6$), lithium borofluoride (LiBF$_4$), lithium hexafluoroarsenide (LiAsF$_6$), and lithium trifluorometasulfonate (LiCF$_3$SO$_3$), etc. In principle, as illustrated in FIG. 4(C), some electric double layers (EDL) may be conceptually formed by cations (e.g. Li$^+$) and their counter ions (e.g. PF$_6^-$ and BF$_4^-$ anions) and this EDL contribution to the energy storage capacity of a SMC cell is governed by the electrolytic salt concentration in solvent.

Given a sufficient amount of electrode surface areas, the maximum contribution of Mechanism 3 to the overall charge storage capacity is dictated by the concentration of cations or anions. The EDL mechanism typically contributes to less than approximately 10% (more typically <5%) of the total lithium ion storage capacity of a super-battery.

Formation of Redox Pairs (Mechanism 4):

A surface redox reaction can occur between a lithium ion and a functional group (if any), such as carbonyl (>C=O) or carboxylic group (—COOH), as illustrated in FIG. 4(A). The presence of functional groups, such as —COOH and >C=O, in chemically prepared graphene oxide have been well documented. The formation of these functional groups is a natural result of the oxidizing reactions of graphite by sulfuric acid and strong oxidizing agents (e.g. nitric acid and potassium permanganate commonly used in the preparation of graphene oxide). Both un-separated graphite worms (exfoliated graphite) and the separated graphene sheets (NGPs) can have surface- or edge-borne functional groups. This is the primary lithium storing mechanism disclosed in our co-pending application (U.S. patent application Ser. No. 12/928,927). The super-battery in the instant application is based mainly upon Mechanisms 1 and 2.

In general, the electric double layer mechanism contributes to less than 10% (mostly less than 5%) of the charge storage capacity of a super-battery. When the cathode contains some multi-layer graphene platelets, there might be some intercalation of lithium into the bulk of an active material if the super-battery operating voltage goes below 1.5 volts. Even in this case, no more than 20% (typically <<10%) of the lithium is stored in the bulk of the cathode active material when the device is in a discharged state.

Nano-structured materials for use in the cathode of the instant invention may preferably contain nano graphene platelet (NGP), carbon nano-tube (CNT), or disordered carbon. The CNT is a better known material in the nano material industry and, hence, will not be further discussed herein. What follows is a description of NGP and nano-structured disordered carbon:

Nano Graphene Platelet (NGP)

The applicant's research group was the first in the world to discover single-layer graphene [B. Z. Jang and W. C. Huang, "Nano-scaled Graphene Plates," U.S. patent application Ser. No. 10/274,473 (Oct. 21, 2002); now U.S. Pat. No. 7,071,258 (Jul. 4, 2006)] and the first to use graphene for supercapacitor [L. Song, A. Zhamu, J. Guo, and B. Z. Jang "Nano-scaled Graphene Plate Nanocomposites for Supercapacitui Eleetiodes" U.S. patent application Ser. No. 11/499,861 (Aug. 7, 2006), now U.S. Pat. No. 7,623,340 (Nov. 24, 2009)], and for lithium-ion battery applications [A. Zhamu and B. Z. Jang, "Nano Graphene Platelet-Based Composite Anode Compositions for Lithium Ion Batteries," U.S. patent application Ser. No. 11/982,672 (Nov. 5, 2007), now U.S. Pat. No. 7,745,047 (Jun. 29, 2010)].

Single-layer graphene or the graphene plane (a layer of carbon atoms forming a hexagonal or honeycomb-like structure) is a common building block of a wide array of graphitic materials, including natural graphite, artificial graphite, soft carbon, hard carbon, coke, activated carbon, carbon black, etc. In these graphitic materials, typically multiple graphene sheets are stacked along the graphene thickness direction to form an ordered domain or crystallite of graphene planes. Multiple crystallites of domains are then connected with disordered or amorphous carbon species. In the instant application, we are able to extract or isolate these crystallites or domains to obtain multiple-layer graphene platelets out of the disordered carbon species. In some cases, we exfoliate and separate these multiple-graphene platelets into isolated single-layer graphene sheets. In other cases (e.g. in activated carbon, hard carbon, and soft carbon), we chemically removed some of the disordered carbon species to open up gates, allowing liquid electrolyte to enter into the interior (exposing graphene surfaces to electrolyte).

In the present application, nano graphene platelets (NGPs) or "graphene materials" collectively refer to single-layer and multi-layer versions of graphene, graphene oxide (slightly oxidized graphene having no functional group for lithium reaction), graphene fluoride, hydrogenated graphene, nitrogenated graphene, doped graphene, etc.

For the purpose of defining the geometry of an NGP, the NGP is described as having a length (the largest dimension), a width (the second largest dimension), and a thickness. The thickness is the smallest dimension, which is no greater than 100 nm and, in the present application, no greater than 10 nm (preferably no greater than 5 nm). The NGP may be single-layer graphene. When the platelet is approximately circular in shape, the length and width are referred to as diameter. In the presently defined NGPs, there is no limitation on the length and width, but they are preferably smaller than 10 μm and more preferably smaller than 1 μm. We have been able to produce NGPs with length smaller than 100 nm or larger than 10 μm. The NGP can be pristine graphene (with essentially 0% oxygen content, typically <2% oxygen) or graphene oxide (typically from 5% up to approximately 45% by weight oxygen). Graphene oxide can be thermally or chemically reduced to become reduced graphene oxide (typically with an oxygen content of 1-20%, mostly below 5% by weight). For use in the cathode of the functional material-based super-battery disclosed in our earlier application, the oxygen content was preferably in the range of 5% to 30% by weight, and more preferably in the range of 10% to 30% by weight. However, in the instant application, the super-battery electrode typically has less than 5% oxygen (hence, essentially functional group-free) and, in many cases, less than 2%. The graphene specific surface area accessible to liquid electrolyte is the single most important parameter in dictating the energy and power densities of a super-battery.

Figure 6:
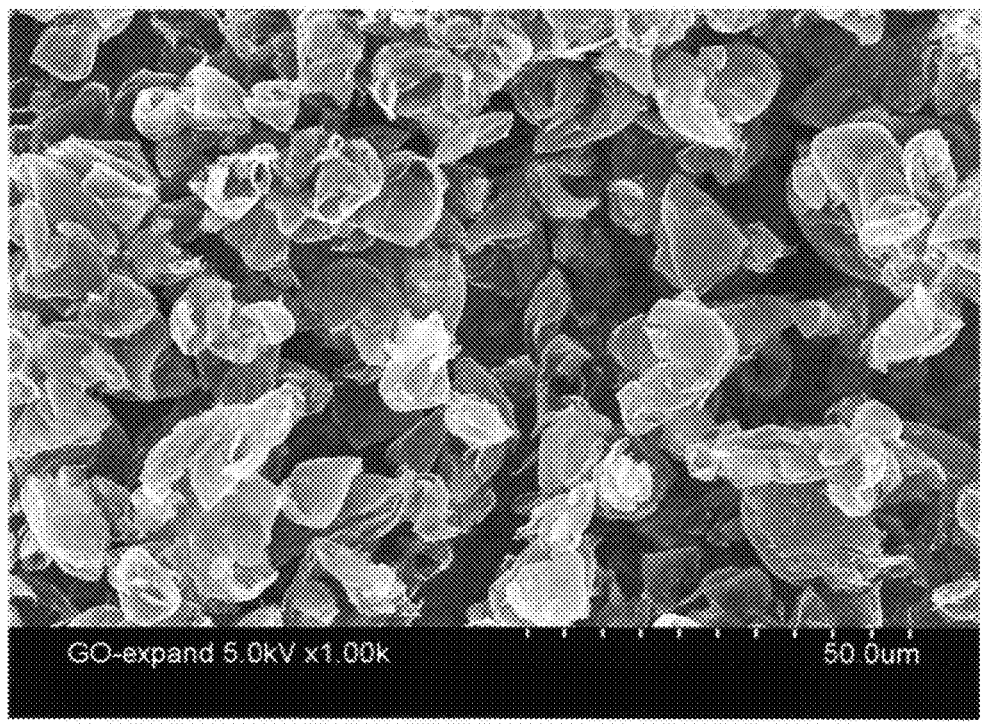
FIG. 6 (A) A SEM image of curved nano graphene sheets; (B) A SEM image of another graphene morphology. All these graphene morphologies provide very high specific surface area (typically from 300 to 2,000 m$^2$/g).
Figure 6:
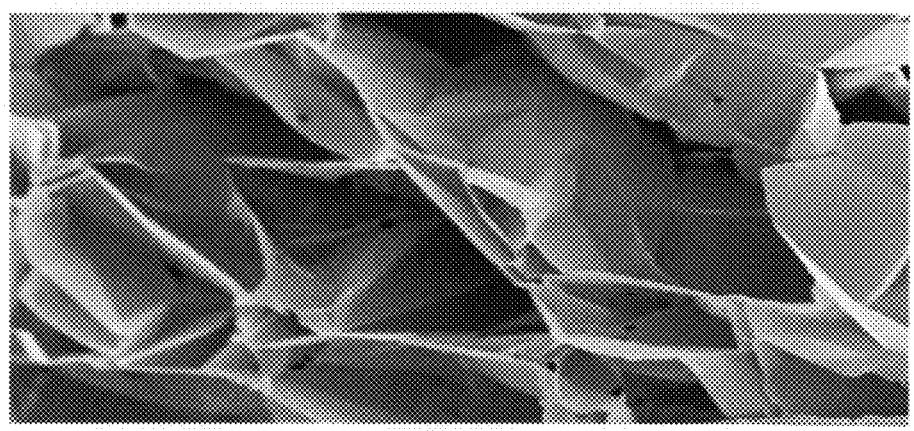

Despite the fact that individual graphene sheets have an exceptionally high specific surface area, flat-shaped graphene sheets prepared by conventional routes have a great tendency to re-stack together or overlap with one another, thereby dramatically reducing the specific surface area that is accessible by the electrolyte. FIG. 6(A) shows a new breed of graphene that is herein referred to as the curved graphene platelet or sheet. Curved NGPs are capable of forming a meso-porous structure having a desired pore size range (e.g. slightly >2 nm) when they were stacked together to form an electrode. This size range appears to be conducive to being accessible by the commonly used lithium-containing electrolytes.

The curved NGPs may be produced by using the following recommended procedures:
(a) dispersing or immersing a laminar graphite material (e.g., natural graphite powder) in a mixture of an intercalant and an oxidant (e.g., concentrated sulfuric acid and nitric acid, respectively) to obtain a graphite intercalation compound (GIC) or graphite oxide (GO);
(b) exposing the resulting GIC or GO to a thermal shock, preferably in a temperature range of 600-1,100° C. for a short period of time (typically 15 to 60 seconds), to obtain exfoliated graphite or graphite worms (some oxidized NGPs with a thickness <100 nm could be formed at this stage if the intercalation/oxidation step was allowed to proceed for a sufficiently long duration of time; e.g. >24 hours);
(c) dispersing the exfoliated graphite to a liquid medium to obtain a graphene-liquid suspension (a functionalizing agent may be added into this suspension if functional groups are desired, as in our co-pending application);
(d) aerosolizing the graphene-liquid suspension into liquid droplets while concurrently removing the liquid to recover curved NGPs. Without the aerosolizing step, the resulting graphene platelets tend to be flat-shaped.

It may be noted that steps (a) to (b) are the most commonly used steps to obtain exfoliated graphite (FIG. 6B) and graphene oxide platelets in the field. Step (d) is essential to the production of curved graphene sheets. Oxidized NGPs or GO platelets may be chemically reduced to recover conductivity properties using hydrazine as a reducing agent, before, during, or after chemical functionalization.

In 2007, we reported a direct ultrasonication method of producing pristine nano graphene directly from graphite particles dispersed in a surfactant-water suspension [A. Zhamu, et al, "Method of Producing Exfoliated Graphite, Flexible Graphite, and Nano-Scaled Graphene Plates," U.S. patent application Ser. No. 11/800,728 (May 8, 2007)]. This method entails dispersing natural graphite particles in a low surface tension liquid, such as acetone or hexane. The resulting suspension is then subjected to direct ultrasonication for 10-120 minutes, which produces graphene at a rate equivalent to 20,000 attempts to peel off graphene sheets per second per particle. The graphite has never been intercalated or oxidized and, hence, requires no subsequent chemical reduction. This method is fast, environmentally benign, and can be readily scaled up, paving the way to the mass production of pristine nano graphene materials. The same method was later studied by others and now more commonly referred to as the "liquid phase production."

Nano-Structured Disordered Carbon

The disordered carbon material may be selected from a broad array of carbonaceous materials, such as a soft carbon, hard carbon, polymeric carbon (or carbonized resin), mesophase carbon, coke, carbonized pitch, carbon black, activated carbon, or partially graphitized carbon. A disordered carbon material is typically formed of two phases wherein a first phase is small graphite crystal(s) or small stack(s) of graphite planes (with typically up to 10 graphite planes or aromatic ring structures overlapped together to form a small ordered domain) and a second phase is non-crystalline carbon, and wherein the first phase is dispersed in the second phase or bonded by the second phase. The second phase is made up of mostly smaller molecules, smaller aromatic rings, defects, and amorphous carbon. Typically, the disordered carbon is highly porous (e.g., activated carbon) or present in an ultra-fine powder form (e.g. carbon black) having nano-scaled features (hence, a high specific surface area).

Soft carbon refers to a carbonaceous material composed of small graphite crystals wherein the orientations of these graphite crystals or stacks of graphene sheets are conducive to further merging of neighboring graphene sheets or further growth of these graphite crystals or graphene stacks using a high-temperature heat treatment (graphitization). Hence, soft carbon is said to be graphitizable.

Hard carbon refers to a carbonaceous material composed of small graphite crystals wherein these graphite crystals or stacks of graphene sheets are not oriented in a favorable directions (e.g. nearly perpendicular to each other) and, hence, are not conducive to further merging of neighboring graphene sheets or further growth of these graphite crystals or graphene stacks (i.e., not graphitizable).

Carbon black (CB), acetylene black (AB), and activated carbon (AC) are typically composed of domains of aromatic rings or small graphene sheets, wherein aromatic rings or graphene sheets in adjoining domains are somehow connected through some chemical bonds in the disordered phase (matrix). These carbon materials are commonly obtained from thermal decomposition (heat treatment, pyrolyzation, or burning) of hydrocarbon gases or liquids, or natural products (wood, coconut shells, etc).

The preparation of polymeric carbons by simple pyrolysis of polymers or petroleum/coal tar pitch materials has been known for approximately three decades. When polymers such as polyacrylonitrile (PAN), rayon, cellulose and phenol formaldehyde were heated above 300° C. in an inert atmosphere they gradually lost most of their non-carbon contents. The resulting structure is generally referred to as a polymeric carbon. Depending upon the heat treatment temperature (HTT) and time, polymeric carbons can be made to be insulating, semi-conducting, or conducting with the electric conductivity range covering approximately 12 orders of magnitude. This wide scope of conductivity values can be further extended by doping the polymeric carbon with electron donors or acceptors. These characteristics uniquely qualify polymeric carbons as a novel, easy-to-process class of electro-active materials whose structures and physical properties can be readily tailor-made.

Polymeric carbons can assume an essentially amorphous structure, or have multiple graphite crystals or stacks of graphene planes dispersed in an amorphous carbon matrix. Depending upon the HTT used, various proportions and sizes of graphite crystals and defects are dispersed in an amorphous matrix. Various amounts of two-dimensional condensed aromatic rings or hexagons (precursors to graphene planes) can be found inside the microstructure of a heat treated polymer such as a PAN fiber. An appreciable amount of small-sized graphene sheets are believed to exist in PAN-based polymeric carbons treated at 300-1,000° C. These species condense into wider aromatic ring structures (larger-sized graphene sheets) and thicker plates (more graphene sheets stacked together) with a higher HTT or longer heat treatment time (e.g., >1,500° C.). These graphene platelets or stacks of graphene sheets (basal planes) are dispersed in a non-crystalline carbon matrix. Such a two-phase structure is a characteristic of some disordered carbon material.

There are several classes of precursor materials to the disordered carbon materials of the instant patent application. For instance, the first class includes semi-crystalline PAN in a fiber form. As compared to phenolic resin, the pyrolized PAN fiber has a higher tendency to develop small crystallites that are dispersed in a disordered matrix. The second class, represented by phenol formaldehyde, is a more isotropic, essentially amorphous and highly cross-linked polymer. The third class includes petroleum and coal tar pitch materials in bulk or fiber forms. The precursor material composition, heat treatment temperature (HTT), and heat treatment time (Htt) are three parameters that govern the length, width, thickness (number of graphene planes in a graphite crystal), and chemical composition of the resulting disordered carbon materials.

In the present investigation, PAN fibers were subjected to oxidation at 200-350° C. while under a tension, and then partial or complete carbonization at 350-1,500° C. to obtain polymeric carbons with various nano-crystalline graphite structures (graphite crystallites). Selected samples of these polymeric carbons were further heat-treated at a temperature in the range of 1,500-2,000° C. to partially graphitize the materials, but still retaining a desired amount of amorphous carbon (no less than 10%). Phenol formaldehyde resin and petroleum and coal tar pitch materials were subjected to similar heat treatments in a temperature range of 500 to 1,500° C. The disordered carbon materials obtained from PAN fibers or phenolic resins are preferably subjected to activation using a process commonly used to produce activated carbon (e.g., treated in a KOH melt at 900° C. for 1-5 hours). This activation treatment is intended for making the disordered carbon meso-porous, enabling liquid electrolyte to reach the edges or surfaces of the constituent aromatic rings after the super-battery device is made. Such an arrangement enables the lithium ions in the liquid to readily deposit onto graphene surfaces without having to undergo solid-state diffusion.

Certain grades of petroleum pitch or coal tar pitch may be heat-treated (typically at 250-500° C.) to obtain a liquid crystal-type, optically anisotropic structure commonly referred to as meso-phase. This meso-phase material can be extracted out of the liquid component of the mixture to produce meso-phase particles or spheres.

Physical or chemical activation may be conducted on all kinds of disordered carbon (e.g. a soft carbon, hard carbon, polymeric carbon or carbonized resin, meso-phase carbon, coke, carbonized pitch, carbon black, activated carbon, or partially graphitized carbon) to obtain activated disordered carbon. For instance, the activation treatment can be accomplished through oxidizing, $CO_2$ physical activation, KOH or NaOH chemical activation, or exposure to nitric acid, fluorine, or ammonia plasma (for the purpose of creating electrolyte-accessible pores, not for functionalization).

In summary, the cathode active material of the presently invented non-functionalized material-based super-battery may be selected from (a) A porous disordered carbon material selected from a soft carbon, hard carbon, polymeric carbon or carbonized resin, meso-phase carbon, coke, carbonized pitch, carbon black, activated carbon, or partially graphitized carbon; (b) A graphene material selected from a single-layer sheet or multi-layer platelet of graphene, lightly oxidized graphene oxide, graphene fluoride, hydrogenated graphene, nitrogenated graphene, boron-doped graphene, nitrogen-doped graphene, non-functionalized graphene, or reduced graphene oxide; (c) Exfoliated graphite; (d) Mesoporous carbon; (e) A carbon nanotube selected from a single-walled carbon nanotube or multi-walled carbon nanotube; (f) A carbon nano-fiber, metal nano-wire, metal oxide nano-wire or fiber, or conductive polymer nano-fiber, or (g) A combination thereof.

The present invention also provides a method of operating a lithium super-battery cell, said method including: (A) Providing a lithium super-battery cell comprising an anode, a lithium source, a porous separator, liquid or gel electrolyte, and a cathode, wherein the cathode has a non-functionalized material having lithium-capturing surfaces and said cell has an open-circuit voltage from 0.5 volts to 2.0 volts; (B) Releasing lithium ions from the lithium source into the electrolyte during the first discharge of the cell; and (C) Exchanging lithium ions between the anode and the lithium-capturing surfaces of the cathode during a subsequent charge or discharge in a cell operating in a voltage range of 1.5 volts and 4.5 volts.

Preferably and typically, both the charge and discharge of the cell do not involve lithium intercalation or solid state diffusion. Preferably, the lithium source is a prelithiated compound or lithium intercalation compound (in a Type-2 lithium super-battery) and step (B) of releasing lithium ions from the lithium source occurs in a first voltage range, and wherein an operation of the cell occurs in a second voltage range different from the first voltage range. Preferably, the lithium source is a prelithiated graphite, prelithiated carbon material, lithiated titanium dioxide, lithium titanate, lithium manganate, a lithium transition metal oxide, $Li_4Ti_5O_{12}$, or a combination thereof The present invention provides yet another method of operating a lithium super-battery cell, the method including: (A) Providing a lithium super-battery cell comprising an anode, a lithium source, a porous separator, electrolyte having an initial amount of lithium ions, and a cathode, wherein the cathode has a material having lithium-capturing surfaces in contact with said electrolyte; (B) Releasing lithium ions from the lithium source into the electrolyte during the first discharge of the cell; (C) Operating the cathode to capture lithium ions from the electrolyte and store the captured lithium on cathode surfaces; and (D) Exchanging an amount of lithium ions, greater than the initial amount, between the anode and the lithium-capturing surfaces of the cathode during a subsequent charge or discharge operation.

The following examples serve to illustrate the preferred embodiments of the present invention and should not be construed as limiting the scope of the invention:

Example 1: Functionalized and Non-Functionalized Soft Carbon (One Type of Disordered Carbon), and Soft Carbon-Based Super-Battery Cells Non-functionalized and functionalized soft carbon materials were prepared from a liquid crystalline aromatic resin. The resin was ground with a mortar, and calcined at 900° C. for 2 h in a $N_2$ atmosphere to prepare the graphitizable carbon or soft carbon. The resulting soft carbon was mixed with small tablets of KOH (four-fold weight) in an alumina melting pot. Subsequently, the soft carbon containing KOH was heated at 750° C. for 2 h in $N_2$. Upon cooling, the alkali-rich residual carbon was washed with hot water until the outlet water reached a pH value of 7. The resulting material is activated, but non-functionalized soft carbon.

Separately, some portion of the activated soft carbon was then immersed in a 90% $H_2O_2$-10% $H_2O$ solution at 45° C. for an oxidation treatment that lasted for 2 hours. Then, the resulting partially oxidized soft carbon was immersed in HCOOH at room temperature for functionalization for 24 hours. The resulting functionalized soft carbon was dried by heating at 60° C. in a vacuum oven for 24 hours.

Coin cells using functionalized soft carbon as a cathode, a sheet of current collector, a thin piece of lithium foil as a lithium source implemented between an anode current collector and a separator layer (Sample-1A) were made and tested. Corresponding cells without functionalization (Sample-1B) were also prepared and tested for comparison. In all cells, the separator used was one sheet of micro-porous membrane (Celgard 2500). The current collector for each of the two electrodes was a piece of carbon-coated aluminum foil. The electrode was a composite composed of 85 wt. % soft carbon (+5% Super-P and 10% PTFE binder coated on Al foil). The electrolyte solution was 1 M $LiPF_6$ dissolved in a mixture of ethylene carbonate (EC) and dimethyl carbonate (DMC) with a 3:7 volume ratio. The separator was wetted by a minimum amount of electrolyte to reduce the background current. Cyclic voltammetry and galvanostatic measurements of the lithium cells were conducted using an Arbin 32-channel supercapacitor-battery tester at room temperature (in some cases, at a temperature as low as −40° C. and as high as 60° C.).

Figure 7A:
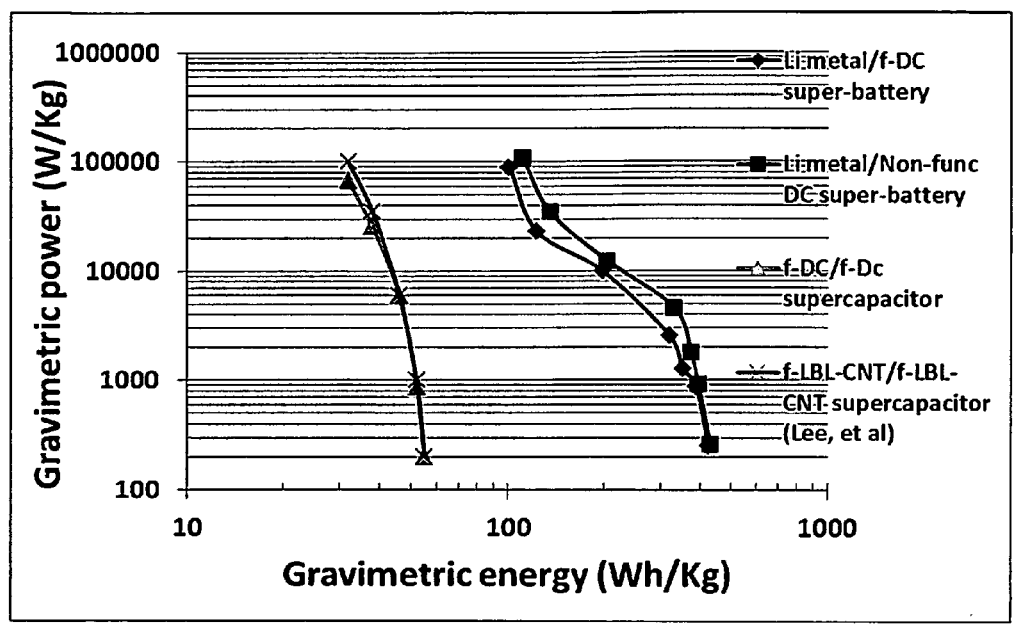
FIG. 7 (A) Ragone plots of 4 cells: a functionalized disordered carbon-based lithium super-battery, a corresponding non-functionalized lithium super-battery, a prior art symmetric supercapacitor, and another prior art symmetric supercapacitor based on LBL functionalized CNT electrodes (Lee, et al); (B) Lon-term cycling stability of a non-functionalized NGP-based super-battery of the instant application vs. that of a super-battery (with functional groups in its cathode) of an earlier application.
Figure 7B:
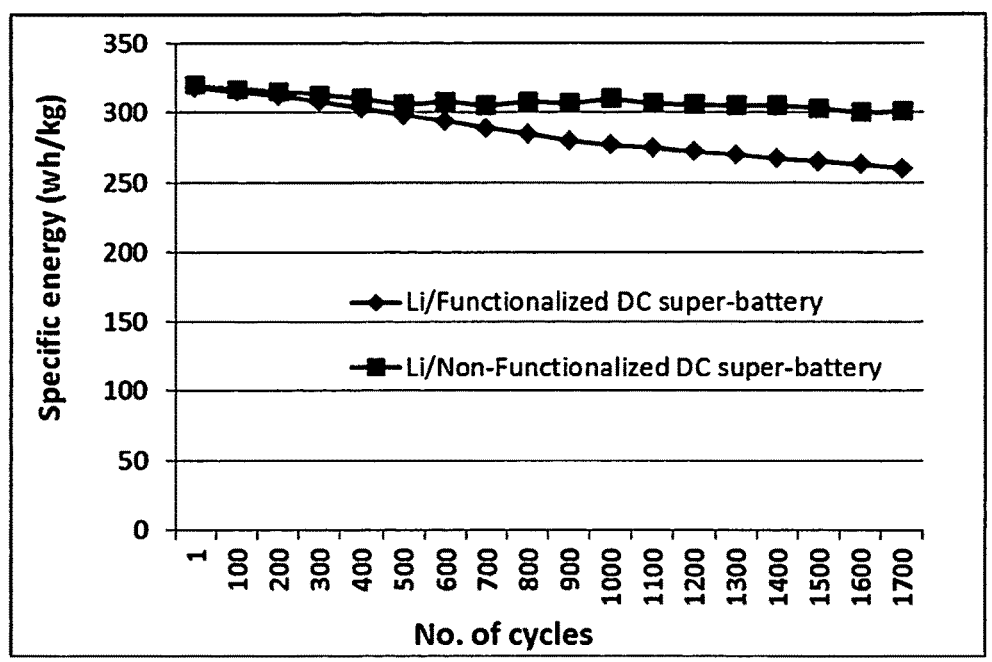

Galvanostatic studies of the super-battery (Sample-1A) with a functionalized soft carbon-based bulk material (thickness >200 μm) as a cathode active material and those of the corresponding non-functionalized material-based super-battery cell (Sample-1B) have enabled us to obtain significant data as summarized in the Ragone plot of FIG. 7(A) and cycling stability data (FIG. 7(B)). These plots allow us to make the following observations:

(a) Both super-battery cells (with a functionalized or non-functionalized cathode material) exhibit significantly higher energy densities and power densities than those of the corresponding symmetric supercapacitors and those of the prior art supercapacitor composed of a functionalized LBL CNT anode and a functionalized LBL-CNT cathode of Lee, et al (both supercapacitors having no lithium foil as a lithium source). Actually, the two symmetric supercapacitors (without a lithium source), based on either disordered carbon or functionalized LBL CNT, exhibit almost identical Ragone plots even though the two electrodes are dramatically different in thickness (>100 μm for the disordered carbon electrode and <3.0 μm for the LBN-CNT electrode). This is likely a manifestation of the local electric double layer mechanism associated with a conventional supercapacitor that does not require long-range transport of the charges (in particular, requiring no exchange of lithium ions between the anode and the cathode). The amounts of lithium ions and their counter-ions (anions) are limited by the solubility of a lithium salt in the solvent. The amounts of lithium that can be captured and stored in the active material surfaces of the cathode in super-batteries are dramatically higher than this solubility limit.

(b) As mentioned earlier in the Background section, the power density of a state-of-the-art supercapacitor is typically of 5,000-10,000 W/Kg, but that of a lithium-ion battery is 100-500 W/kg. This implies that the presently invented partially surface-mediated lithium ion-exchanging cells have an energy density comparable to that of a modern battery, which is 5-16 times higher than the energy density of conventional supercapacitors. The super-battery cells also exhibit a power density (or charge-discharge rates) significantly higher than the power density of conventional electrochemical supercapacitors.

(c) Most significantly, the non-functionalized material-based partially surface-mediated cells exhibit much better cycle stability as compared to the corresponding functional material-based cells. As demonstrated in FIG. 7(B), the non-functionalized surface cell maintains a high energy density even after 2500 charge/discharge cycles. However, the functionalized surface-controlled cell suffers a faster decay with repeated charges/discharges. We believe that the functional groups have a propensity to chemically react with some chemical species in the electrolyte, resulting in a gradual reduction in useful functional groups for forming a redox pair with lithium. This was evidenced by the liquid electrolyte turning in color from dark blue to yellowish after 1000 cycles in the cell containing a functionalized material cathode.

The cells of Sample-1A work on the redox reactions of lithium ions with select functional groups on the surfaces/edges of aromatic rings at the cathode side. These functional groups, attached to both the edge and plane surfaces of aromatic rings (small graphene sheets), are capable of rapidly and reversibly react with lithium. The super-battery cells (Sample-1B) based on non-functionalized surfaces perform even better. The partially surface-mediated lithium ion-exchanging battery of the present invention is a revolutionary new energy storage device that fundamentally differs from a supercapacitor and a lithium-ion battery. In terms of both energy density and power density, neither conventional lithium-ion battery or supercapacitor even comes close.

Example 2: NGPs from Sulfuric Acid Intercalation and Exfoliation of MCMBs

MCMB 2528 microbeads (Osaka Gas Chemical Company, Japan) have a density of about 2.24 $g/cm^3$; a median size of about 22.5 microns, and an inter-planar distance of about 0.336 nm. MCMB 2528 (10 grams) were intercalated with an acid solution (sulfuric acid, nitric acid, and potassium permanganate at a ratio of 4:1:0.05) for 24 hours. Upon completion of the reaction, the mixture was poured into deionized water and filtered. The intercalated MCMBs were repeatedly washed in a 5% solution of HCl to remove most of the sulphate ions. The sample was then washed repeatedly with deionized water until the pH of the filtrate was neutral. The slurry was dried and stored in a vacuum oven at 60° C. for 24 hours. The dried powder sample was placed in a quartz tube and inserted into a horizontal tube furnace pre-set at a desired temperature, 600° C. for 30 seconds to obtain exfoliated graphite. The exfoliated MCMB sample was subjected to further functionalization in formic acid at 25° C. for 30 minutes in an ultrasonication bath to obtain functionalized graphene (f-NGP). Non-functionalized NGPs were also obtained via ultrasonication of exfoliated MCMBs in water without any functionalizing agent.

Figure 8A:
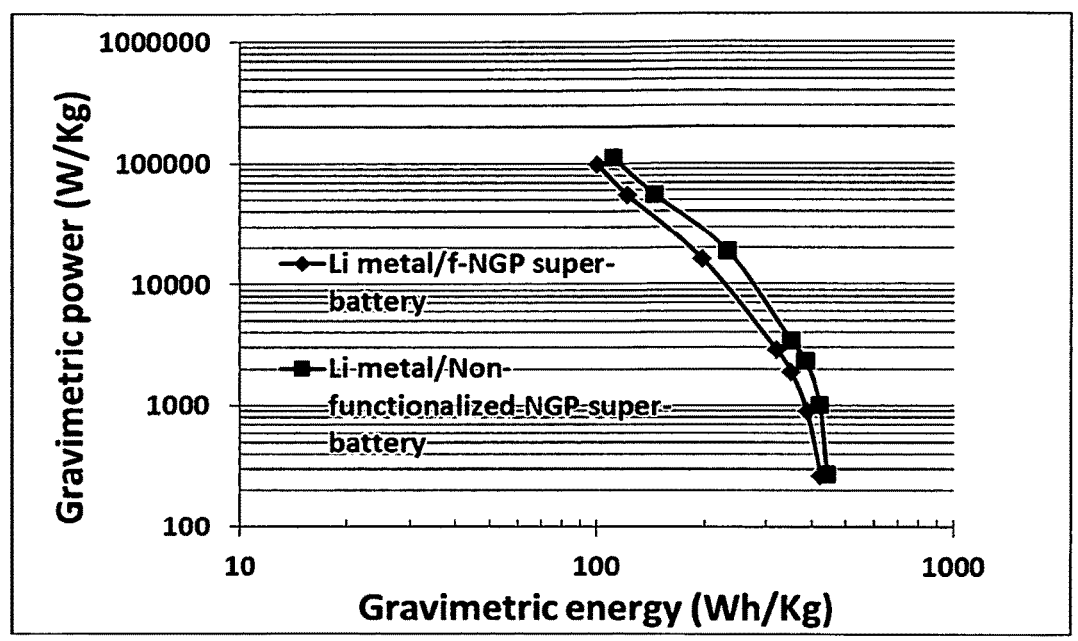
FIG. 8 (A) Ragone plots of a functionalized NGP-based lithium super-battery and a corresponding non-functionalized lithium super-battery; (B) Lon-term cycling stability of a non-functionalized NGP-based super-battery of the instant application vs. that of a super-battery (with functional groups in its cathode) of an earlier application.
Figure 8B:
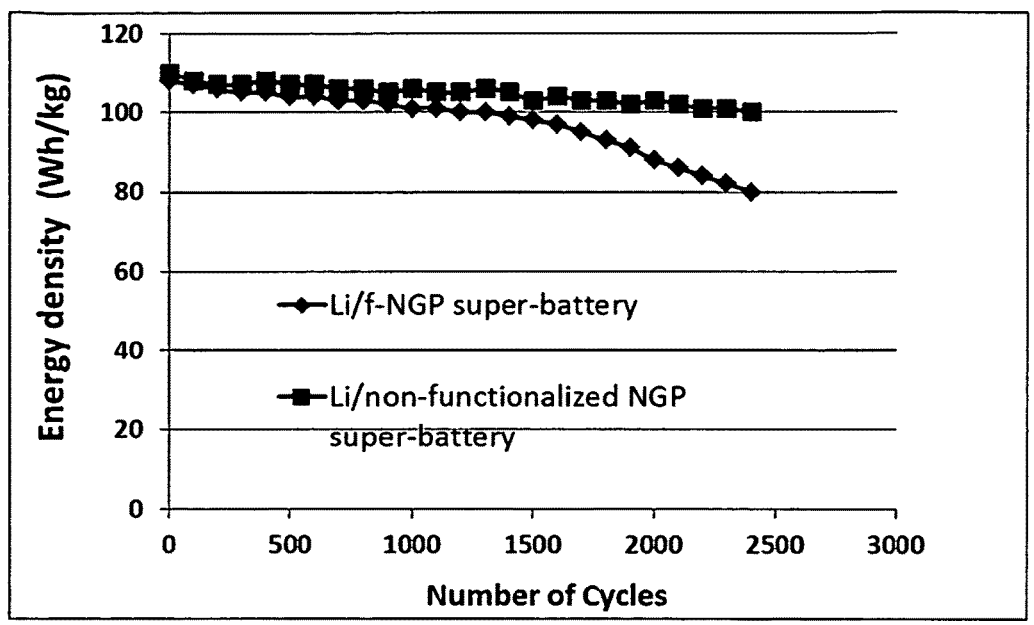

For a functionalized or non-functionalized super-battery, NGPs were used as a cathode active material. A lithium foil was added between the anode and the separator. The Ragone plot for these two types of cells is shown in FIG. 8(A). Both of the NGP-based, partially surface-mediated, lithium ion-exchanging battery devices exhibit excellent energy densities and power densities. The non-functionalized material-based device performs slightly better than the functionalized counterpart in terms of energy density and power density. Also quite significantly and surprisingly, as compared with the functionalized one, the non-functionalized material-based super-battery exhibits a much better long-term stability as repeated charges/discharges continue (FIG. 8(B)).

Example 3: Super-Battery Cells Based on Graphene Materials (NGPs) from Natural Graphite, Carbon Fibers, and Artificial Graphite and Based on Carbon Black (CB) and Treated CB A wide variety of super-batteries have been prepared and tested in the present investigation. Oxidized NGP or graphene oxide (GO) was prepared with a modified Hummers' method that involved exposing the starting graphitic materials to a mixture of sulfuric acid, sodium nitrate, and potassium permanganate at a ratio of 4:1:0.1 for 72 hours. The resulting GO was then thoroughly rinsed with water to obtain GO suspension, which was followed by two different routes of material preparation. One route involved subjecting the GO suspension to ultrasonication to obtain isolated graphene oxide sheets suspended in water (N-type). The other route involved spray-drying GO suspension to obtain graphite intercalation compound (GIC) or GO powder. The GIC or GO powder was then thermally exfoliated at 1,050° C. for 45 seconds to obtain exfoliated graphite or graphite worms (G-type). Exfoliated graphite worms from artificial graphite and carbon fibers were then subjected to ultrasonication to separate or isolate oxidized graphene sheets. Carbon black (CB) was subjected to a chemical treatment similar to the Hummers' method to open up nano-gates, enabling electrolyte access to the interior (t-CB).

Each cathode, composed of 85% graphene, 5% Super-P (AB-based conductive additive), and 10% PTFE, was coated on Al foil. The thickness of the electrode was typically around 150-200 μm, but an additional series of samples with thicknesses of approximately 80, 100, 150 μm was prepared to evaluate the effect of electrode size on the power and energy densities of the resulting supercapacitor-battery cells. Electrodes as thin as 20 μm were also made for comparison. The electrode was dried in a vacuum oven at 120° C. for 12 hours before use. The negative electrode was Li metal foil. Coin-size cells were assembled in a glove box using 1M $LiPF_6$/EC+DMC as electrolyte.

Example 4: Type-2 Super-Battery (Prelithiated Compound as a Lithium Source and Non-Functionalized Graphene as the Cathode Active Material) Vs. Prior Art Lithium-Ion Capacitor (Prelithiated Graphite as an Anode Active Material and Activated Carbon as the Cathode Active Material)

Figure 9:
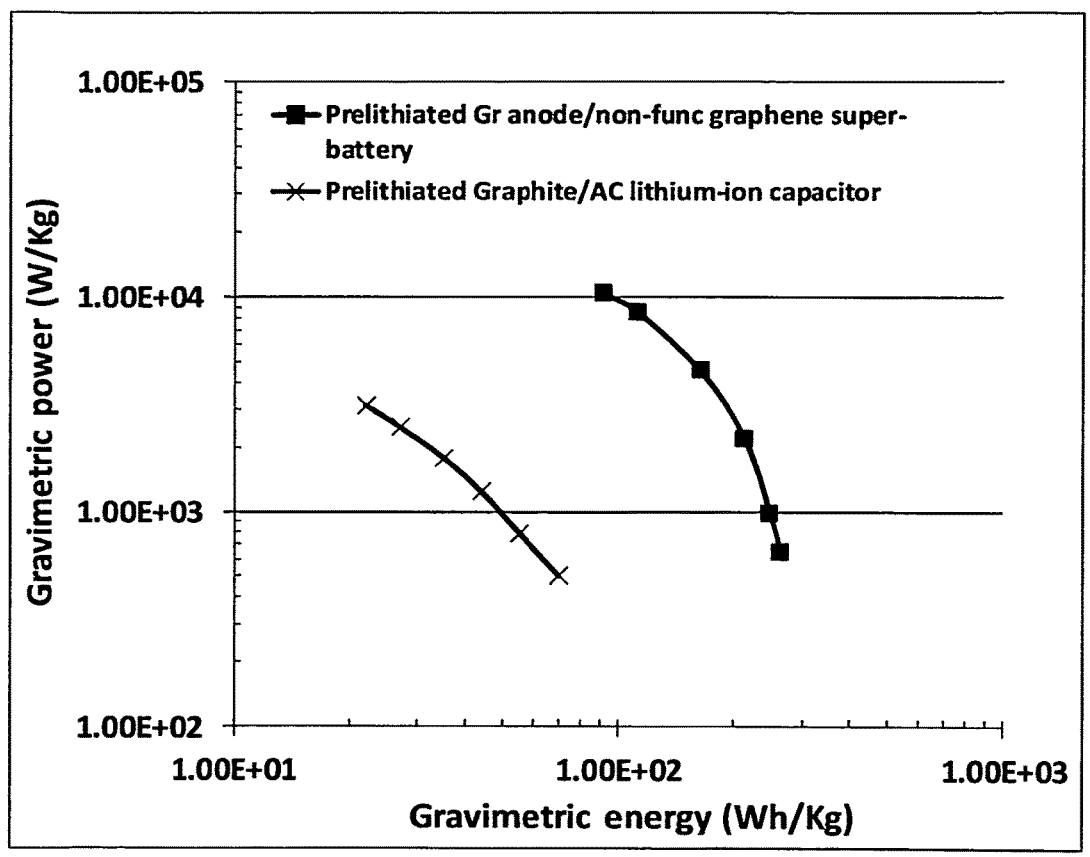
FIG. 9 The Ragone plots of a Type-2 lithium-super-battery featuring a prelithiated graphite as a lithium ion source and a graphene-based cathode active material (with an open-circuit voltage of 1.5 volts and operating in the voltage range of 1.5-4.5 volts) and a corresponding lithium-ion capacitor using a prelithiated graphite as an anode active material and an activated carbon cathode (with an open-circuit voltage of 2.2 volts and operating in the voltage range of 2.2-3.8 volts). The selection of a graphene cathode as opposed to an activated carbon cathode (hence, different in composition) makes a major difference in performance between a Type-2 lithium battery of the instant invention and the prior art lithium-ion capacitor. The operating modes are also different.

Natural graphite (supplied from Huadong Graphite Co., Qingdao, China) was made into an electrode and prelithiated by assembling the graphite electrode and a lithium foil into a half-cell configuration. The graphite electrode was "charged" with lithium up to an amount of intercalated lithium corresponding to approximately 350 mAh/g of graphite weight using a voltage range of from 3.0 volts to 0 volts. This half-cell was then disassembled and the prelithiated graphite electrode was recovered. This prelithiated graphite was used as the anode active material, along with a sheet of porous separator, lithium salt-based electrolyte, and a non-functionalized graphene electrode as a cathode active material, to form a Type-2 super-battery. For comparison, a corresponding lithium-ion capacitor (LIC) was fabricated using activated carbon (AC, supplied from Ashbury Carbon Co.) as the cathode active material and a similar prelithiated graphite anode. The capacity of each of the two cells was measured with galvanostatic experiments using an Arbin SCTS electrochemical testing instrument. Cyclic voltammetry (CV) was conducted on a CHI 660 Instruments electrochemical workstation. The graphene-based super-battery (having an open-circuit voltage of 1.5 volts) was operated in the voltage range of 1.5-4.5 volts, while the AC-based LIC (found to have an open-circuit voltage of 2.2 volts) was operated in the voltage range of 2.2-3.8 volts. Quite surprisingly, the LIC was not able to operate above 3.8 volts and, in contrast, the super-battery could easily reach 4.5 volts. The Ragone plots for these two devices are shown in FIG. 9, which demonstrate the stunning difference between the presently invented super-battery and the prior art lithium-ion capacitor.

In conclusion, the instant invention provides a revolutionary energy storage device that has the best features of both the supercapacitor and the lithium ion battery. These partially surface-enabled, lithium ion-exchanging cells, with their materials and structures yet to be optimized, ale already capable of storing an energy density of typically 80-160 $Wh/kg_{cell}$, which is 30 times higher than that of conventional electric double layer (EDL) supercapacitors. The power density of 100 $kW/kg_{cell}$ is 10 times higher than that (10 $kW/kg_{cell}$) of conventional EDL supercapacitors and 100 times higher than that (1 $kW/kg_{cell}$) of conventional lithium-ion batteries. These surface-mediated cells can be re-charged in seconds, as opposed to hours for conventional lithium ion batteries. This is truly a major breakthrough and revolutionary technology.

We claim:

1. A partially surface-mediated lithium ion-exchanging cell comprising:
    (a) A positive electrode (cathode) consisting essentially of a binder, a conductive additive, and a cathode active material selected from the group consisting of (A) a porous disordered carbon material selected from an activated soft carbon, activated hard carbon, activated polymeric carbon or carbonized resin, activated mesophase carbon, activated coke, activated carbonized pitch, activated carbon black, or activated partially graphitized carbon that contain electrolyte-accessible pores; (B) a graphene material selected from a single-layer sheet or multi-layer platelet of hydrogenated graphene, nitrogenated graphene, boron-doped graphene, or nitrogen-doped graphene, forming a mesoporous structure; (C) exfoliated graphite; (D) mesoporous carbon; and (E) combinations thereof, wherein said cathode active material has surface area to capture or store lithium thereon, wherein the cathode contains no functionalized material that has a functional group to capture a lithium ion, wherein said cathode has interconnected pores each having a size ranging from 2 nm to 50 nm;
    (b) A negative electrode (anode) being composed of an anode current collector and a lithium source implemented at the anode prior to a first discharge of the cell, wherein said lithium source is selected from a lithium chip, lithium alloy chip, lithium foil, lithium alloy foil, lithium powder, lithium alloy powder, surface stabilized lithium particles, or a combination thereof;
    (c) A porous separator disposed between the two electrodes; and
    (d) A lithium-containing electrolyte in physical contact with the two electrodes;
    wherein said cathode active material has a specific surface area of no less than 100 $m^2/g$ being in direct physical contact with said electrolyte to receive lithium ions therefrom and storing said lithium atoms on surface active sites that are immersed in said electrolyte or to provide lithium ions thereto without lithium intercalation or de-intercalation, wherein said partially surface-mediated lithium ion-exchanging cell is not a supercapacitor and wherein a charge or discharge operation of said partially surface-mediated lithium ion-exchanging cell involves an exchange of lithium ions between said negative electrode and said positive electrode.

2. The cell of claim 1, wherein said cell has an open-circuit voltage of at least 1.2 volts.

3. The cell of claim 1, wherein said cell has an open-circuit voltage of at least 1.5 volts.

4. The cell of claim 1, wherein at least 90% of the lithium is stored on surfaces of said cathode active material, with said lithium being in direct physical contact with said cathode surfaces, when the cell is in a discharged state.

5. The cell of claim 1, wherein the electrolyte is liquid electrolyte or gel electrolyte containing a first amount of lithium ions.

6. The cell of claim 1, wherein a charge or discharge operation of the cell does not involve lithium intercalation or solid state diffusion.

7. The cell of claim 5, wherein an operation of said cell involves an exchange of a second amount of lithium ions between said cathode and said anode and said second amount of lithium is greater than said first amount.

8. The cell of claim 1, wherein said cell operates in a voltage range of from 1.5 volts to 4.5 volts.

9. The cell of claim 1, wherein said cell operates in a voltage range of from 1.5 volts to 4.0 volts.

10. The cell of claim 1, wherein said cell containing a liquid organic electrolyte operates in a voltage range above 3.8 volts.

11. The cell of claim 1, wherein said cathode active material has a specific surface area of no less than 500 $m^2/g$ that is in direct contact with said electrolyte.

12. The cell of claim 1, wherein said cathode active material has a specific surface area of no less than 1,000 $m^2/g$ that is in direct contact with said electrolyte.

13. The cell of claim 1, wherein said cathode active material has a specific surface area of no less than 1,500 $m^2/g$ that is in direct contact with said electrolyte.

14. The cell of claim 1, wherein said cathode active material has a specific surface area of no less than 2,000 $m^2/g$ that is in direct contact with said electrolyte.

15. The cell of claim 1, wherein no more than 10% of the lithium is stored in the bulk of said cathode active material when the cell is in a discharged state.

16. The cell of claim 1 wherein said cathode active material is a graphene material containing no functional group.

17. The cell of claim 1 wherein said disordered carbon material is formed of two phases with a first phase being graphite crystals or stacks of graphene planes and a second phase being non-crystalline carbon, and wherein the first phase is dispersed in the second phase or bonded by the second phase.

18. The cell of claim 1 wherein said electrolyte comprises a lithium salt-doped ionic liquid.

19. The cell of claim 1 wherein said positive electrode has a thickness greater than 100 μm.

20. A method of operating the cell of claim 1, said method including implementing a lithium source at the anode and ionizing said lithium source to release lithium ions into said electrolyte during the first discharge cycle of said cell.

21. A method of operating the cell of claim 1, said method including implementing a lithium source at the cathode and operating said lithium source to release lithium ions into said electrolyte during the first charge cycle of said cell.

22. A method of operating the cell of claim 1, said method including implementing a lithium source at the anode, ionizing said lithium source to release lithium ions into said electrolyte during the first discharge cycle of said cell, and electrochemically driving said released lithium ions to said cathode where said released lithium ions are captured by said cathode active material surfaces.

23. The method of claim 22, further comprising a step of releasing lithium ions from said cathode surfaces during a re-charge cycle of said device, electrically driving said released lithium ions to an anode current collector surface or said lithium source using an external battery charging device.

* * * * *